(12) United States Patent
Ricci et al.

(10) Patent No.: US 10,633,474 B2
(45) Date of Patent: Apr. 28, 2020

(54) VANADIUM PYRIDINE-IMINE COMPLEX, CATALYTIC SYSTEM COMPRISING SAID VANADIUM PYRIDINE-IMMINE COMPLEX AND A (CO) POLYMERIZATION PROCESS OF CONJUGATED DIENES

(71) Applicant: versalis S.p.A., San Donato Milanese (MI) (IT)

(72) Inventors: Giovanni Ricci, Parma (IT); Giuseppe Leone, Milan (IT); Anna Sommazzi, Novara (IT); Francesco Masi, Sant'Angelo Lodigiano (IT)

(73) Assignee: versalis S.p.A., San Donato Milanese (MI) (IT)

( * ) Notice: Subject to any disclaimer, the term of this patent is extended or adjusted under 35 U.S.C. 154(b) by 0 days.

(21) Appl. No.: 15/765,782

(22) PCT Filed: Nov. 10, 2016

(86) PCT No.: PCT/IB2016/056775
§ 371 (c)(1),
(2) Date: Apr. 4, 2018

(87) PCT Pub. No.: WO2017/081638
PCT Pub. Date: May 18, 2017

(65) Prior Publication Data
US 2018/0282458 A1    Oct. 4, 2018

(30) Foreign Application Priority Data
Nov. 11, 2015 (IT) .................. 102015000071628

(51) Int. Cl.
C08F 236/08 (2006.01)
C08F 236/06 (2006.01)
(Continued)

(52) U.S. Cl.
CPC ............ *C08F 236/08* (2013.01); *C07F 9/005* (2013.01); *C08F 136/06* (2013.01); *C08F 136/08* (2013.01); *C08F 236/06* (2013.01)

(58) Field of Classification Search
None
See application file for complete search history.

(56) References Cited

U.S. PATENT DOCUMENTS

2011/0071294 A1    3/2011 Lang et al.

FOREIGN PATENT DOCUMENTS

CN           1331252 A    1/2002
WO   WO 2011/005868 A1    1/2011

OTHER PUBLICATIONS

Machine translation of Yi et al. (CN1331252A). (Year: 2002).*

(Continued)

*Primary Examiner* — Catherine S Branch
(74) *Attorney, Agent, or Firm* — Oblon, McClelland, Maier & Neustadt, L.L.P.

(57) ABSTRACT

Vanadium pyridine-imine complex having general formula (I), wherein: —$R_1$, $R_2$, $R_3$, $R_4$, $R_5$ and $R_6$, equal to or different from each other, represent a hydrogen atom; or are selected from linear or branched $C_1$-$C_{20}$ alkyl groups, preferably $C_1$-$C_{15}$, optionally halogenated cycloalkyl groups optionally substituted, aryl groups optionally substituted; —$X_1$, $X_2$ and $X_3$, equal to or different from each other, represent a halogen atom such as, for example, chlorine, bromine, iodine, preferably chlorine; or are selected from linear or branched $C_1$-$C_{20}$ alkyl groups, preferably $C_1$-$C_{15}$, —$OCOR_7$ groups or —$OR_7$ groups wherein $R_7$ is selected from linear or branched $C_1$-$C_{20}$ alkyl groups, preferably $C_1$-$C_{15}$; —Y is selected from ethers such as, for example, diethylether, tetrahydrofuran (THF), dimethoxyethane, pref- (Continued)

erably is tetrahydrofuran (THF); —n is 0 or 1. Said vanadium pyridine-imine complex having general formula (I) can be advantageously used in a catalytic system for the (co) polymerization of conjugated dienes.

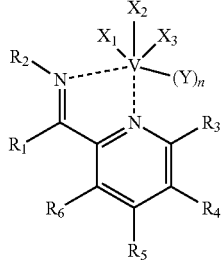

(I)

(51) Int. Cl.
$C07F\ 9/00$ (2006.01)
$C08F\ 136/08$ (2006.01)
$C08F\ 136/06$ (2006.01)

(56) References Cited

OTHER PUBLICATIONS

International Search Report and Written Opinion dated Feb. 27, 2017 in PCT/IB2016/056775.
Jian Jun Yi, et al., "High-molecular-weight Polyethylene Prepared with Early Transition Metal Catalysts", Chinese Chemical Letters, vol. 16, No. 10, XP009189267, 2005, pp. 1386-1388.
Elena Colamarco, et al., "Homo- and Copolymerization of Butadiene Catalyzed by an Bis(imino)pyridyl Vanadium Complex", Macromolecular Rapid Communications, vol. 25, XP002756020, 2004, pp. 450-454.

17 Claims, 10 Drawing Sheets

\* cited by examiner

VANADIUM PYRIDINE-IMINE COMPLEX, CATALYTIC SYSTEM COMPRISING SAID VANADIUM PYRIDINE-IMMINE COMPLEX AND A (CO) POLYMERIZATION PROCESS OF CONJUGATED DIENES

The present invention relates to a vanadium pyridine-imine complex.

More particularly, the present invention relates to a vanadium pyridine-imine complex and to the use thereof into a catalytic system for the (co)polymerization of conjugated dienes.

The present invention also relates to a catalytic system for the (co)polymerization of conjugated dienes comprising said vanadium pyridine-imine complex.

Furthermore, the present invention relates to a (co)polymerization process of conjugated dienes, in particular a process for the polymerization of 1,3-butadiene or isoprene, characterized by using said catalytic system.

Figure 1:
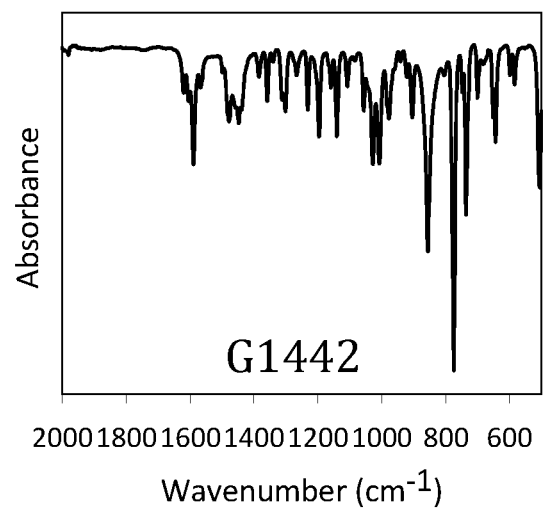
FIG. 1 shows the FT-IR spectrum (solid state, UATR) of the obtained polybutadiene (Absorbance; Wavenumbers).

It is known that the stereospecific (co)polymerization of conjugated dienes is a very important process in the chemical industry in order to obtain products which are among the most widely used rubbers.

Said stereospecific (co)polymerization can give polymers having different structure, that is trans-1,4 structure, cis-1,4 structure, 1,2 structure and, in the case of asimmetric conjugated dienes (e.g., isoprene), 3,4 structure.

The vanadium-based catalytic systems have been known for a long time in the field of the (co)polymerization of conjugated dienes for their capability of providing diene (co)polymers with a trans-1,4 structure, and these systems are by far the most widely used systems for the preparation of trans-1,4 polybutadiene as described, for example, in: Porri L. et al., "*Comprehensive Polymer Science*" (1989), Eastmond G. C. et al. Eds., Pergamon Press, Oxford, UK, Vol. 4, Part II, pag. 53-108.

Heterogeneous catalytic systems obtained by combining vanadium halides [e.g., vanadium(III)chloride ($VCl_3$), vanadium(IV)chloride ($VCl_4$)] with aluminium-alkyls [e.g., triethylaluminium ($AlEt_3$), diethylaluminium chloride ($AlEt_2Cl$)], provide a trans-1,4 polybutadiene (content of trans-1,4 units equal to 97%-100%), crystalline, with a high molecular weight, and having a melting point ($T_m$) of about 145° C. Further details related to said catalytic systems can be found, for example, in: Natta G. et al., "*La Chimica e L'Industria*" (1958), Vol. 40, pag. 362 and "*Chemical Abstract*" (1959), Vol. 53, pag. 195; Natta G. et al., "*La Chimica e L'Industria*" (1959), Vol. 41, pag. 116 and "*Chemical Abstract*" (1959), Vol. 53, pag. 15619.

Polybutadiene with a high content of trans-1,4 units, but with lower molecular weight, can be prepared with homogeneous catalytic systems such as, for example, vanadium (III)chloride(tris-tetrahydrofuran)/diethylaluminum chloride ($VCl_3$ $(THF)_3$/$AlEt_2Cl$), vanadium(III) (tris-acetylacetonate)/diethylaluminum chloride [$V(acac)_3$/$AlEt_2Cl$] and vanadium(III) (tris-acetylacetonate)/methylaluminoxane [$V(acac)_3$/MAO].

Further details related to said catalytic systems can be found, for example, in: Natta G. et al., "*Atti Accademia Nazionale dei Lincei—Classe di Scienze fisiche, matematiche e naturali*" (1961), Vol. 31(5), pag. 189 and "*Chemical Abstract*" (1962), Vol. 57, pag. 4848; Porri L. et al., "*Die Makromoleculare Chemie*" (1963), Vol. 61(1), pag. 90-103; Ricci G. et al., "*Polymer Communication*" (1991), Vol. 32, pag. 514-517; Ricci G. et al., "*Journal of Polymer Science Part A: Polymer Chemistry*" (2007), Vol. 45(20), pag. 4635-4646.

Some of the above-mentioned homogeneous catalytic systems, for example, vanadium(III)(tris-acetylacetonate)/triethylaluminum [$V(acac)_3$/$AlEt_3$], are of certain interest for the preparation of 1,2 polybutadiene, as described, for example, in Natta G. et al., "*La Chimica e L'Industria*" (1959), Vol. 41, pag. 526 and "*Chemical Abstract*" (1960), Vol. 54, pag. 1258.

Catalytic systems obtained by combining vanadium cyclopentadienyl derivatives such as, for example, bis(cyclopentadienyl)chlorovanadium/methylaluminoxane ($VCp_2Cl$/MAO) and cyclopentadienyldichloro(tris-triethylphosphine)vanadium(IV)/methylaluminoxane [$VCpCl_2$ $(PEt_3)_3$/MAO], are capable of providing a polybutadiene mainly with a structure cis-1,4 (content of cis-1,4 units equal to about 85%). Further details related to said catalytic systems can be found, for example, in: Ricci G. et al., "*Polymer*" (1996), Vol. 37(2), pag. 363-365; Porri L. et al., "*Metalorganic Catalyst for Synthesis and Polymerization*" (1999), Kaminsky W. Ed., Springer-Verlag Berlin Heidelberg, pag. 519-530; Porri L. et al., "*Metallocene-Based Polyolefins*" (2000), Scheirs J. and Kaminsky W. Eds., John Wiley & Sons Ltd., pag. 115-141.

It is also known that the vanadium-based catalytic systems are also active for the polymerization of isoprene. In particular, the catalytic system trialkyl-aluminum/vanadium (III)chloride ($AlR_3/VCl_3$ wherein R=methyl, ethyl, propyl, butyl, preferably ethyl), provides polyisoprene with high content of trans-1,4 units, even if the activity level is rather low.

Preferably, said polymerization is carried out by operating at a Al/V molar ratio preferably ranging from 3 to 6, in the presence of an aliphatic solvent (e.g., n-heptane), at relatively low temperature, preferably ranging from 20° C. to 50° C. In fact, by working at temperatures over 50° C., the vanadium-carbon bonds become unstable, the vanadium(III) reduces into vanadium(II) which is an inactive species from the catalytic point of view and the polymeryzation rate quickly fall.

Recently, in order to improve the stability of the vanadium-based catalytic systems to the temperature, several new systems based on vanadium trichloride complexes with ligands having nitrogen atoms as donor atoms (e.g., pyridin-bis-imines, bis-imines), in combination with suitable alkylating agents [e.g., diethylaluminum chloride ($AlEt_2Cl$)], were studied: interesting and encouraging results were obtained, and these new systems have proved to be active in the homo- and copolymerization of ethylene, providing elastomeric polyolefins of certain interest from the applicative point of view.

Colamarco E. et al., in "*Macromolecular Rapid Communications*" (2004), Vol. 25, pag. 450-454, disclose a vanadium complex with a nitrogen-containing ligand, i.e. a bis(imino)pyridine vanadium (III) complex activated by different co-catalysts [e.g., diethylaluminum chloride ($AlEt_2Cl$), triethyldialuminum trichloride ($Al_2Et_3Cl_3$), methylaluminoxane (MAO)] capable of promoting the 1,4 polymerization of butadiene with decisely low values of catalytic activity.

As the (co)polymers of conjugated dienes, in particular polybutadiene and polyisoprene, can be advantageously used for the manufacture of tires, in particular for tire treads, as well as in the footwear industry (for example, in the manufacture of soles for shoes), the study of new catalytic systems capable of providing said (co)polymers is still of great interest.

The Applicant has faced the problem of finding a new vanadium pyridine-imine complex, with a high catalytic activity, usable in a catalytic system capable of giving (co)polymers of conjugated dienes, such as, for example, linear or branched polybutadiene or linear or branched polyisoprene, with a high yield with respect to the charged monomer.

The Applicant has now found a new vanadium pyridine-imine complex having general formula (I) defined below, capable of giving (co)polymers of conjugated dienes, such as, for example, linear or branched polybutadiene or polyisoprene, with a high yield with respect to the charged monomer.

Therefore, it represents an object of the present invention a vanadium pyridine-imine complex having general formula (I):

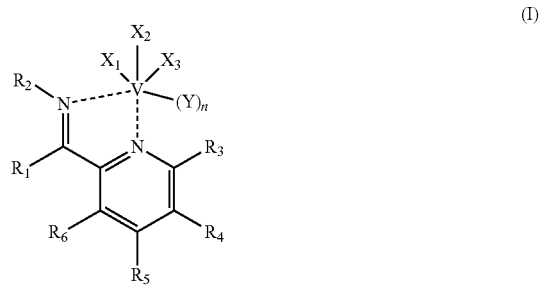

wherein:

$R_1$, $R_2$, $R_3$, $R_4$, $R_5$ and $R_6$, equal to or different from each other, represent a hydrogen atom; or are selected from linear or branched $C_1$-$C_{20}$ alkyl groups, preferably $C_1$-$C_{15}$, optionally halogenated, cycloalkyl groups optionally substituted, aryl groups optionally substituted;

$X_1$, $X_2$ and $X_3$, equal to or different from each other, represent a halogen atom such as, for example, chlorine, bromine, iodine, preferably chlorine; or are selected from linear or branched $C_1$-$C_{20}$ alkyl groups, preferably $C_1$-$C_{15}$, —$OCOR_7$ groups or —$OR_7$ groups wherein $R_7$ is selected from linear or branched $C_1$-$C_{20}$ alkyl groups, preferably $C_1$-$C_{15}$;

Y is selected from ethers such as, for example, diethyl ether, tetrahydrofuran (THF), dimethoxyethane, preferably is tetrahydrofuran (THF);

n is 0 or 1.

For the aim of the present description and of the following claims, the definitions of the numerical ranges always comprises the extremes unless otherwise specified.

For the aim of the present description and of the following claims, the term "comprising" also includes the terms "which consists essentially of" or "which consists of".

The term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "$C_1$-$C_{20}$ alkyl groups optionally halogenated" means alkyl groups having from 1 to 20 carbon atoms, linear or branched, saturated or unsaturated, wherein at least one of the hydrogen atoms is substituted with an halogen atom such as, for example, fluorine, chlorine, bromime, preferably fluorine, chlorine. Specific examples of $C_1$-$C_{20}$ alkyls groups optionally containing heteroatoms are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl.

The term "cycloalkyl groups" means cycloalkyl groups having from 3 to 30 carbon atoms. Said cycloalkyl groups can be optionally substituted with one or more groups, equal to or different from each other, selected from: halogen atoms; hydroxyl groups; $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

The term "aryl groups" means aromatic carbocyclic groups. Said aromatic carbocyclic groups can be optionally substituted with one or more groups, equal to or different from each other, selected from: halogen atoms such as, for example, fluorine, chlorine, bromine; hydroxyl groups; $C_1$-$C_{12}$ alkyl groups; $C_1$-$C_{12}$ alkoxy groups; cyano groups; amino groups; nitro groups. Specific examples of aryl groups are: phenyl, 2-methyl-phenyl, 2,4,6-trimethylphenyl, 2,6-di-iso-propylphenyl, methoxyphenyl, hydroxyphenyl, phenyloxyphenyl, fluorophenyl, pentafluorophenyl, clorophenyl, bromophenyl, nitrophenyl, dimethylaminophenyl, naphthyl, phenylnaphthyl, phenanthrene, anthracene.

According to a preferred embodiment of the present invention, in said vanadium pyridine-imine complex having general formula (I):

- $R_1$ represent a hydrogen atom; or is selected from linear or branched $C_1$-$C_{20}$ alkyl groups, preferably $C_1$-$C_{15}$, preferably is methyl;
- $R_2$ is selected from cycloalkyl groups optionally substituted, preferably is cyclohexyl; or from aryl groups optionally substituted, preferably is 2,6-di-iso-propylphenyl, 2-methyl-phenyl, 2,4,6-trimethylphenyl;
- $R_3$, $R_4$, $R_5$ and $R_6$, equal to each other, represent a hydrogen atom;
- $X_1$, $X_2$ and $X_3$, equal to each other, represent a halogen atom such as, for example, chlorine, bromine, iodine, preferably chlorine;
- Y is tetrahydrofuran (THF);
- n is 1.

The vanadium pyridine-imine complex having general formula (I) has to be intended, according to the present invention, under any physical form such as, for example, the isolated and purified solid form, the solvated form with a suitable solvent, or that one supported on suitable organic or inorganic solids, preferably having granular or powder physical form.

The vanadium pyridine-imine complex having general formula (I) is prepared starting from ligands known in the art.

Specific examples of ligands useful for the aim of the present invention are those having the following formulae (L1)-(L4):

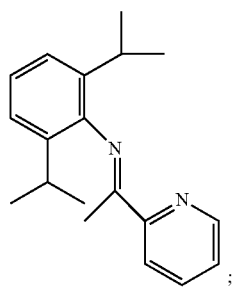

(L1)

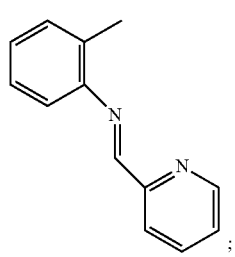

(L2)

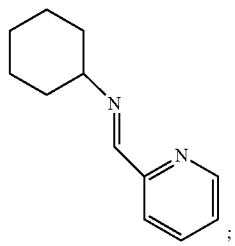

(L3)

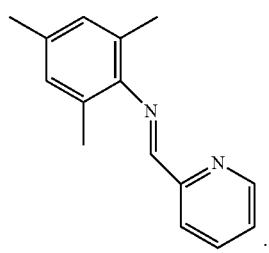

(L4)

Said ligands having the formulae (L1)-(L4), can be prepared by the processes known in the art. For example, said ligands having the formulae (L1)-(L4) can be prepared by a process comprising: (1) reactions of condensation between a suitable aniline or cyclohexylamine and 2-pyridinecarboxaldehyde or 2-acetylpyridine, with the formation of the corresponding imine as described, for example, in: Wu J. et al., "*Journal of American Chemistry Society*" (2009), Vol. 131(36), pg. 12915-12917; Laine V. T. et al., "*European Journal of Inorganic Chemistry*" (1999), Vol. 6, pg. 959-964; Bianchini C. et al., "*New Journal of Chemistry*" (2002), Vol. 26(4), pg. 387-397; Lai Yi-C. et al., "*Tetrahedron*" (2005), Vol. 61(40), pg. 9484-9489.

The vanadium pyridine-imine complex having general formula (I) can be prepared according to processes known in the art. For example, said vanadium pyridine-imine complex having general formula (I) can be prepared through the reaction between vanadium compounds having general formula $V(X)_3$ wherein V is vanadium and X is an halogen atom such as, for example, chlorine, bromime, iodine, preferably chlorine, as such or complexed with ethers [for example, diethylether, tetrahydrofuran (THF), dimethoxyethane], preferably complexed with tetrahydrofuran (THF), with the ligands having formulae (L1)-(L4) reported above, in a ligand (L)/vanadium (V) molar ratio ranging from 1 to 1.5, by operating, preferably, in the presence of at least one solvent which can be selected, for example, from: chlorinated solvents (for example, methylene chloride), ether solvents [for example, tetrahydrofuran (THF)], alcohol solvents (for example, butanol), hydrocarbon solvents (for example, toluene), or mixtures thereof, at room temperature or higher. The vanadium pyridine-imine complex having general formula (I) thus obtained can be then recovered through the method known in the art such as, for example, precipitation through a non-solvent (for example, pentane, hexane), followed by separation through filtration or decantation and optional subsequent solubilization into a suitable solvent followed by low-temperature crystallization.

For the aim of the present description and of the following claims, the wording "room temperature" means a temperature ranging from 20° C. to 25° C.

As above-mentioned, the present invention also relates to a catalytic system for the (co)polymerization of conjugated dienes comprising said vanadium pyridine-imine complex having general formula (I).

A further object of the present invention, is a catalytic system for the (co)polymerization of conjugated dienes comprising:
(a) at least one vanadium pyridine-immine complex having general formula (I);
(b) at least one co-catalyst selected from aluminum organo-derivative compounds, preferably from:
(b₁) compounds of aluminum having general formula (II):

$$Al(R_9)(R_{10})(R_{11}) \quad (II)$$

wherein $R_9$ represents a hydrogen atom, or a fluorine atom, or is selected from linear or branched $C_1$-$C_{20}$ alkyl groups, cycloalkyl groups, aryl groups, alkylaryl groups, arylalkyl groups, alkoxy groups; $R_{10}$ and $R_{11}$, equal to or different from each other, are selected from linear or branched $C_1$-$C_{20}$ alkyl groups, cycloalkyl groups, aryl groups, alkylaryl groups, arylalkyl groups;

(b₂) aluminoxanes having general formula (III):

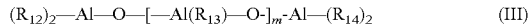
$$(R_{12})_2-Al-O-[-Al(R_{13})-O-]_m-Al-(R_{14})_2 \quad (III)$$

wherein $R_{12}$, $R_{13}$ and $R_{14}$, equal to or different from each other, represent a hydrogen atom, or a halogen atom such as, for example, chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and m is an integer ranging from 0 to 1000;

(b₃) aluminum organo-derivative compounds partially hydrolyzed;

(b₄) halogen-aluminum alkyls having general formula (IV) or (V):

$$Al(R_{15})_p(X_3)_{3-p} \quad (IV)$$

$$Al_2(R_{15})_q(X_3)_{3-q} \quad (V)$$

wherein p is 1 or 2; q is an integer ranging from 1 to 5; $R_{15}$, equal to or different from each other, are selected from linear or branched $C_1$-$C_{20}$ alkyl groups; $X_3$ represents a chlorine or bromine atom, preferably chlorine;

or mixtures thereof.

Specific example of aluminum compounds having general formula (II) particularly useful for the aim of the present invention are: diethylaluminum hydride, di-n-propylaluminum hydride, di-n-butylaluminum hydride, di-iso-butyl-aluminum hydride (DIBAH), diphenylaluminum hydride, di-p-tolylaluminum hydride, dibenzylaluminum hydride, diethylaluminum hydride, phenyl-n-propylaluminum hydride, p-tolylethylaluminum hydride, p-tolyl-n-propylaluminum hydride, p-tolyl-iso-propylaluminum hydride, benzylethylaluminum hydride, benzyl-n-propylaluminum hydride, benzyl-iso-propylaluminum hydride, diethylaluminum ethoxide, di-iso-butylaluminum ethoxyde, dipropylaluminum ethoxide, trimethylaluminum, trietylaluminum (TEA), tri-n-propylaluminum, tri-iso-butylaluminum (TIBA), tri-n-butylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyldi-p-tolylaluminum, ethyldibenzylaluminum, diethylphenylaluminum, diethyl-p-tolylaluminum, diethylbenzylaluminum. Triethylaluminum (TEA), tri-n-propylaluminum, tri-iso-butylaluminum (TIBA), triexylaluminum, di-iso-butylaluminum hydride (DIBAH), diethylaluminum fluoride, are particularly preferred.

As known, the aluminoxanes are compounds containing Al—O—Al bonds, with a variable ratio O/Al, obtainable according to processes known in the art such as, for example, through the reaction, under controlled conditions, of an alkyl aluminum, or of an alkyl aluminum halide, with water or with other compounds containing predetermined amounts of available water, such as, for example, in the case of the reaction of aluminum trimethyl with aluminum sulphate hexahydrate, copper sulphate pentahydrate, or iron sulfate pentahydrate.

Said aluminoxanes and, in particular, methylaluminoxane (MAO), are compounds obtainable by the known processes of metalorganic chemistry such as, for example, by adding trimethyl aluminum to a suspension in hexane of aluminum sulfate hydrate.

Specific examples of aluminoxanes having general formula (III) particularly useful for the aim of the present invention are: methylaluminoxane (MAO), ethylaluminoxane, n-butylaluminoxane, tetra-iso-butylaluminoxane (TIBAO), tert-butylaluminoxane, tetra-(2,4,4-trimetylpenthyl)aluminoxane (TIOAO), tetra-(2,3-dimethylbutyl) aluminoxane (TDMBAO), tetra-(2,3,3-trimetylbuthyl)aluminoxane (TTMBAO). Methylaluminoxane (MAO), as such or in the dry form (MAO-dry) or modified (MAO-modified), tetra-iso-butylaluminoxane (TIBAO), are particularly preferred.

Further details related to the aluminoxanes having general formula (III) can be found in the international patent application WO 2011/061151.

Preferably, the partially hydrolyzed aluminum organo-derivative compounds (b₃), are selected from the aluminum compounds having general formula (II) added with at least one protonating compound, the aluminum compound having general formula (II) and the protonating compound being used in a molar ratio ranging from 0.001:1 to 0.2:1. Preferably, said protonating compound can be selected, for example, from: water; alcohols such as, for example, methanol, ethanol, iso-propyl alcohol, n-propyl alcohol, tert-butanol, iso-butyl alcohol, n-butyl alcohol; higher molecular weight alcohols, such as, for example, 1-decanol, 2-undecanol; carboxylic acids such as, for example, stearic acid; or mixtures thereof. Water is particularly preferred.

Specific examples of halogen-aluminum alkyls having general formula (IV) or (V) are: diethylchloroaluminum (AlEt₂Cl), dimethylaluminum chloride (AlMe₂Cl), ethylaluminumdichloride (AlEtCl₂), di-iso-butylaluminumchloride [Al(i-Bu)₂Cl]; ethylaluminum sesquichloride (Al₂Et₃Cl₃), methylaluminum sesquichloride (Al₂Me₃Cl₃).

Generally, the formation of the catalytic system comprising the vanadium pyridine-imine complex having general formula (I) and the co-catalyst (b), is preferably carried out in an inert liquid medium, more preferably in a hydrocarbon solvent. The choice of the vanadium pyridine-imine complex having general formula generale (I) and of the co-catalyst (b), as well as the particular method used, can vary depending on the molecular structures and the desired result, according to what analogously reported in the literature about species accessible to the person skilled in the art for other complexes of transition metals with ligands of various nature such as, for example, in: Ricci G. et al., "*Advances in Organometallic Chemistry Research*" (2007), Yamamoto K. Ed., Nova Science Publisher, Inc., USA, pg. 1-36; Ricci G. et al., "*Coordination Chemistry Reviews*" (2010), Vol. 254, pg. 661-676; Ricci G. et al., "*Ferrocenes: Compounds, Properties and Applications*" (2011), Elisabeth S. Phillips Ed., Nova Science Publisher, Inc., USA, pg. 273-313; Ricci G. et al., "*Chromium: Environmental, Medical and Material*

*Studies*" (2011), Margaret P. Salden Ed., Nova Science Publisher, Inc., USA, pg. 121-1406; Ricci G. et al., "*Cobalt: Characteristics, Compounds, and Applications*" (2011), Lucas J. Vidmar Ed., Nova Science Publisher, Inc., USA, pg. 39-81; Ricci G. et al., "*Phosphorus: Properties, Health effects and Environment*" (2012), Ming Yue Chen and Da-Xia Yang Eds., Nova Science Publisher, Inc., USA, pg. 53-94.

Preferably, when used for the formation of a catalytic system of (co)polymerization according to the present invention, the (co)catalysts (b) can be placed in contact with a vanadium pyridine-imine complex having general formula (I), in proportions such that the molar ratio between the vanadium present in the vanadium pyridine-imine complex having general formula (I) and the aluminum present in the (co)catalysts (b) can be ranging from 1 to 10000, preferably ranging from 50 to 1000. The sequence through which the vanadium pyridine-imine complex having general formula (I) and the (co)catalysts are placed in contact with each other is not particularly critical.

For the aim of the present description and of the following claims, the terms "mole" and "molar ratio" are used both with reference to compounds consisting of molecules, and with reference to atoms and ions, omitting for these latter the terms gram-atom or atomic ratio, even if scientifically more correct.

For the aim of the present invention, other additives or components can be optionally added to the above-mentioned catalytic system so as to adapt it to satisfy in practice specific requirements. The catalytic systems thus obtained are therefore to be considered as comprised in the aim of the present invention. Additives and/or components which can be added in the preparation and/or formulation of the catalytic system object of the present invention are, for example: inert solvents, such as, for example, aliphatic and/or aromatic hydrocarbons; aliphatic and/or aromatic ethers; weakly coordinating additives (for example, Lewis bases) selected, for example, from non-polymerizable olefins; ethers which are sterically hindered or electronically poor; halogenating agents such as, for example, silicon halides, halogenated hydrocarbons, preferably chlorinated; or mixtures thereof.

Said catalytic system can be prepared, as already reported above, according to methods known in the art.

For example, said catalytic system can be separately prepared (preformed) and subsequently introduced in the (co)polymerization environment. In this regard, said catalytic system, can be prepared by reacting at least one vanadium pyridine-imine complex (a) having general formula (I) with at least one co-catalyst (b), optionally in the presence of other additives or components selected from those reported above, in the presence of a solvent such as, for example, toluene, heptane, at a temperature ranging from 20° C. to 60° C., for a time ranging from 10 seconds to 10 hours, preferably ranging from 30 seconds to 5 hours.

Alternatively, said catalytic system, can be prepared in situ, namely directly in the (co)polymerization environment. In this regard, said catalytic system can be prepared separately introducing the vanadium pyridine-imine complex (a) having general formula (I), the co-catalyst (b) and the selected conjugated diene/dienes to be (co)polymerized, operating under conditions at which the (co)polymerization is carried out.

More details related to the preparation of said catalytic system can be found in the examples reported below.

For the aim of the present invention, the above-mentioned catalytic systems can also be supported on inert solids, preferably consisting of silicon and/or aluminum oxides, such as, for example, silica, alumina or silico-aluminates. For supporting said catalytic systems, the known techniques of supporting comprising, generally, the contact, in a suitable inert liquid medium, between the support, optionally activated by heating at temperatures higher than 200° C., and one or both the components (a) and (b) of the catalytic system object of the present invention, can be used. For the aims of the present invention, it is not necessary that both the components are supported, also only the vanadium pyridine-imine complex (a) having general formula (I), or the co-catalyst (b) being able to be present on the surface of the support. In this latter case, the component lacking on the surface, is then placed in contact with the component supported, when forming the catalyst active for the polymerization is desired.

The vanadium pyridine-imine complex having general formula (I), and the catalytic systems based on it, which were supported on a solid by functionalization of this latter and formation of a covalent bond between the solid and the vanadium pyridine-imine complex having general formula (I), are further comprised within the aim of the present invention.

Furthermore, the present invention relates to a (co)polymerization process of conjugated dienes, characterized by using said catalytic system.

The amount of the vanadium pyridine-imine complex (a) having general formula (I) and of the co-catalyst (b) that can be used in the (co)polymerization of conjugated dienes varies depending on the (co)polymerization process desired to be used. Said amount is however such that to obtain a molar ratio between the vanadium (V) present in the vanadium pyridine-imine complex having general formula (I) and the metal present in the co-catalyst (b), i.e. the aluminum, comprised between the values reported above.

Specific examples of conjugated dienes that can be (co)polymerized using the catalytic system according to the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. 1,3-Butadiene, isoprene are preferred. The above-mentioned (co)polymerizable conjugated dienes can be used alone, or as mixture of two or more dienes. In this latter case, namely using a mixture of two or more dienes, a copolymer will be obtained.

According to a particularly preferred embodiment, the present invention relates to a polymerization process of 1,3-butadiene or isoprene, characterized by using said catalytic system.

Generally, said (co)polymerization can be carried out in the presence of a polymerization solvent generally selected from inert organic solvents such as, for example: saturated aliphatic hydrocarbons such as, for example, butane, pentane, hexane, heptane, or mixtures thereof; saturated cycloaliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably, the (co)polymerization solvent is selected from the aromatic or halogenated hydrocarbons.

Alternatively, said (co)polymerization, can be carried out by using, as (co)polymerization solvent, the same conjugated diene/dienes which must be (co)polymerized, according to the process known as "bulk process".

Generally, the concentration of the conjugated diene to be (co)polymerized in said (co)polymerization solvent is ranging from 5% by weight to 50% by weight, preferably ranging from 10% by weight to 20% by weight, with respect to the total weight of the mixture conjugated diene and inert organic solvent.

Generally, said (co)polymerization can be carried out at temperature ranging from −70° C. to +100° C., preferably ranging from −20° C. to +80° C.

As far as the pressure is concerned, it is preferable to operate at the pressure of the components of the mixture that must be (co)polymerized.

Said (co)polymerization can be carried out both continuously, and in "batch".

As said above, said process allows to obtain (co)polymers of conjugated dienes such as, for example, linear or branched polybutadiene or linear or branched polyisoprene, with a high yield with respect to the charged monomer.

In order to better understand the present invention and put into practise the same, some illustrative but non-limiting examples are reported below.

EXAMPLES

Reagents and Materials

The reagents and materials used in the following examples of the invention, the optional pretreatments thereof and the manufacturer thereof, are reported in the list below:

anhydrous vanadium trichloride (Aldrich): purity degree 99.9%, used as such;
vanadium trichloride:tetrahydrofuran (1:3) complex [$VCl_3(THF)_3$] (Aldrich): purity degree 97%, used as such;
methylaluminoxane (MAO) (toluene solution 10% by weight) (Crompton): used as such; or in the dry form (MAO-dry) obtained by removing the free trimethylaluminum together with the solvent from the toluene solution under vacuum and drying the residue obtained always under vacuum;
modified methylaluminoxane (MAO-modified) (7% toluene solution) (Akzo Nobel): used as such;
tetra-iso-butylaluminoxane (TIBAO) (cyclohexane solution 30% by weight) (Akzo Nobel): used as such;
2,6-di-iso-propylaniline (Aldrich): used as such;
acetylpyridine (Aldrich): used as such;
2-pyridinecarboxaldeyde (Aldrich): used as such;
o-toluidine (Aldrich): used as such;
cyclohexylamine (Aldrich): used as such;
2,4,6-trimethylaniline (Aldrich): used as such;
anhydrous sodium sulphate (Aldrich): purity degree Z 99%, used as such;
heptane (Aldrich): used as such;
formic acid (Aldrich): used as such;
ethyl acetate (Aldrich): used as such;
toluene (Fluka): purity degree >99.5%, maintained under reflux on sodium (Na) for about 8 hours, then distilled and stored on molecular sieves under nitrogen;
pentane (Fluka): purity degree 99%, maintained at reflux on sodium/potassium (Na/K) for about 8 hours, then distilled and stored on molecular sieves under nitrogen;
1,2-dichlorobenzene (Aldrich): purity degree 99%, maintained at reflux on calcium hydride ($CaH_2$) for about 8 hours, then distilled "trap-to-trap" and maintained in nitrogen atmosphere at 4° C.;
hexane (Aldrich): used as such;
1,3-butadiene (Air Liquide): pure, ≤99.5%, evaporating from the container before of each production, dried by passing through a column packed with molecular sieves and condensed into the reactor which was pre-cooled at −20° C.;
isoprene (Aldrich): pure, ≤99%, maintained at reflux on calcium hydride for 2 hours, then distilled "trap-to-trap" and maintained in nitrogen atmosphere at 4° C.;
methanol (Carlo Erba, RPE): used as such, or optionally anhydrified by distillation on magnesium (Mg);
hydrochloric acid in aqueous solution at 37% (Aldrich): used as such;
deuterated tetrachloroethylene ($C_2D_2Cl_4$) (Acros): used as such;
deuterated chloroform ($CDCl_3$) (Acros): used as such.

Analysis and characterization methods, reported below, were used.

Elementary Analysis a) Determination of Vanadium (V)

For determining the weight amount of vanadium (V) in the vanadium pyridine-imine complexes object of the present invention, an aliquot exactly weighted, operating in dry-box under nitrogen flux, of about 30 mg-50 mg of sample, was placed in an approximately 30 ml platinum crucible, togheter with a mixture of 1 ml of hydrofluoric acid (HF) at 40% (Aldrich), 0.25 ml of sulphuric acid ($H_2SO_4$) at 96% (Aldrich) and 1 ml of nitric acid ($HNO_3$) at 70% (Aldrich). The crucible were then heated on a plate increasing the temperature up to the appearance of sulphuric white fumes (about 200° C.). The mixtures thus obtained was cooled at room temperature (20° C.-25° C.), additivated with 1 ml of nitric acid ($HNO_3$) at 70% (Aldrich) and then brought again to fumes appearance. After having repeated for other two times the sequence, a clear solution, almost without colour, was obtained. Then, 1 ml of nitric acid ($HNO_3$) at 70% (Aldrich) and about 15 ml of water, were then added, in the cold, then heated to 80° C., for about 30 minutes. The sample thus prepared was diluted with water having a MilliQ purity up to a weight of about 50 g, exactly weighted, in order to obtain a solution on which the instrumental analytical determination by a ICP-OES spectrometer (optical detection plasma) Thermo Optek IRIS Advantage Duo was carried out, by comparison with known concentration solutions. For this aim, for each analyte, a calibration line was prepared in the range 0 ppm-10 ppm, by measuring solutions of a known titre obtained by dilution by weight of certified solutions.

The sample solution prepared as above was further diluted for weighing so as to obtain concentrations close to those of reference, before carrying out the spectrophotometric detection. All the sample were prepared in duplicate. The results were considered adequate if the individual data of the tests in duplicate did not differ of more than 2% related with respect to their average value.

b) Chlorine Determination

For said aim, samples of the vanadium pyridine-imine complexes object of the present invention, about 30 mg-50 mg, were exactly weighted into 100 ml glass in dry-box under nitrogen flux. 2 g of sodium carbonate ($Na_2CO_3$) (Aldrich) were added and, outside of the dry-box, 50 ml MilliQ water. It is brought to a boil on the plate, under magnetic stirring, for about 30 minutes. After cooling, sulphuric acid ($H_2SO_4$) (Aldrich) diluted 1/5 was added, up to acid reaction and titration with silver nitrate ($AgNO_3$) 0.1 N (Aldrich) by potentiometric titrator.

c) Determination of Carbon, Hydrogen and Nitrogen

The determination of carbon, hydrogen and nitrogen, in the vanadium pyridine-imine complexes object of the present invention, was carried out by a Carlo Erba Mod. 1106 automated analyzer.

$^{13}$C-HMR and $^1$H-HMR Spectra

The $^{13}$C-HMR e $^1$H-HMR spectra were registered by nuclear magnetic resonance spectrometer mod. Bruker Avance 400, by using deuterated tetrachloroethylene ($C_2D_2Cl_4$) at 103° C. and hexamethyldisiloxane (HDMS) (Aldrich) as internal standard, or by using deuterated chloroform ($CDCl_3$) at 25° C. and tetramethylsilane (TMS) (Aldrich) as internal standard. For this aim, polymer solution having concentrations equal to 10% by weight with respect to the total weight of the polymer solution are used.

The microstructure of the polymers was determined through the analysis of the above-mentioned spectra according to what reported in literature by Mochel, V. D., in "Journal of Polymer Science Part A-1: Polymer Chemistry" (1972), Vol. 10, Issue 4, pag. 1009-1018, for the polybutadiene, and by Sato H. et al., in "Journal of Polymer Science: Polymer Chemistry Edition" (1979), Vol. 17, Issue 11, pag. 3551-3558, for the polyisoprene.

Spectra FT-IR (Solid State, UATR)

The FT-IR spectra (solid state, UATR) were registered by Bruker IFS 48 spectrophotometer equipped with an horizontal ATR linkage Thermo Spectra-Tech. The section, in which the samples to be analyzed are placed, is a Fresnel ATR accessory (Shelton, Conn., USA) which uses crystals of zirconium selenide (ZnSe) with an angle of incidence of 45° in the horizontal direction.

The FT-IR spectra (solid state, UATR) of the vanadium pyridine-imine complexes object of the present invention, were obtained by inserting samples of the vanadium pyridine-imine complex to be analyzed in said section.

FT-IR Spectra

The FT-IR spectra were registered by Thermo Nicolet Nexus 670 and Bruker IFS 48 spectrophotometers.

The FT-IR spectra of the polymers, were obtained from polymer films on tablets of potassium bromide (KBr), said films being obtained by deposition of a solution in hot 1,2-dichlorobenzene of the polymer to be analyzed. The concentration of the polymer analyzed solutions was equal to 10% by weight with respect to the total weight of the polymer solution.

Determination of the Molecular Weight

The determination of the molecular weight (MW) and of the Polydispersion Index (PDI) of the polymers obtained, was carried out by a Waters GPCV 2000 system, using two detector lines (i.e. differential viscosimeter and refractometer), operating under the following conditions:

two PLgel Mixed-C columns;

solvent/eluent: 1,2-dichlorobenzene (Aldrich);

flux: 0.8 ml/min;

temperature: 145° C.;

measurement of the molecular mass: Universal Calibration method.

The weight average molecular weight ($M_w$) and the Polydispersion Index (PDI) corresponding to the $M_w/M_n$ ($M_n$=number average molecular weight) ratio are reported.

Example 1

Synthesis of the Ligand Having Formula (L1)

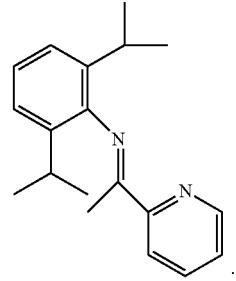

(L1)

In a reactor of 500 ml equipped with a magnetic stirrer, 15.96 g (90 mmoles) of 2,6-di-iso-propylaniline were placed together with 100 ml of methanol, some drops of formic acid and 10.9 g (90 mmoles) of acetyl pyridine: the mixture obtained was left, under stirring, at room temperature, until obtaining the precipitation of a solid product. Said solid product was recovered by filtration, washed with cold methanol and dried, under vacuum, at room temperature, obtaining 16 g of a light-yellow microcrystalline product (yield=64%) having formula (L1).

Elementary analysis [found (calculated for $C_{19}H_{24}N_2$)]: C, 81.52% (81.38%); H, 8.57% (8.63%); N, 9.90% (9.99%).

Molecular Weight (MW): 280.41.

FT-IR (nujol): 1652 cm$^{-1}$ $v_{(C=N)}$.

Example 2

Synthesis of the Ligand Having Formula (L2)

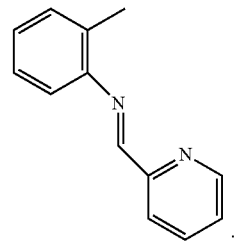

(L2)

In a reactor of 500 ml equipped with a magnetic stirrer, 9.96 g (93 mmoles) of 2-pyridinecarboxaldehyde were placed together with 100 ml of methanol, some drops of formic acid and 9.97 g (93 mmoles) of o-toluidine: the mixture obtained was left, under stirring, at room temperature, for 48 hours. Then, anhydrous sodium sulfate was added and the whole was left, under stirring, at room temperature, for 30 minutes. At the end, the whole was filtered, methanol was removed by distillation at reduced pressure and the yellow oily product obtained was purified by elution on silica gel chromatographic column [eluent: heptane/ethyl acetate mixture in a ratio 90/10 (v/v)], obtaining 15 g of a cold light-yellow solid product (yield=83%) having formula (L2).

Elementary analysis [found (calculated for $C_{13}H_{12}N_2$)]: C, 80.00% (79.56%); H, 6.32% (6.16%); N, 14.57% (14.27%).

Molecular Weight (MW): 196.25.

FT-IR (nujol): 1640 cm$^{-1}$ $v_{(C=N)}$.

Example 3

Synthesis of the Ligand Having Formula (L3)

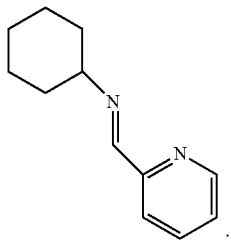

(L3)

In a reactor of 500 ml equipped with a magnetic stirrer, 9.96 g (93 mmoles) of 2-pyridinecarboxyaldehyde were placed together with 100 ml of methanol, some drops of formic acid and 9.23 g (93 mmoles) of cyclohexylamine: the mixture obtained was left, under stirring, at room temperature, for 48 hours. Then, anhydrous sodium sulfate was added and the whole was left, under stirring, at room temperature, for 30 minutes. At the end, the whole was filtered, the methanol was removed by distillation at reduced pressure and the yellow oily product obtained was purified by elution on silica gel chromatographic column [eluent: heptane/ethyl acetate mixture in a ratio 90/10 (v/v)], obtaining 15 g of a microcrystalline light-yellow product (yield=83%) having formula (L3).

Elementary analysis [found (calculated for $C_{12}H_{16}N_2$)]: C, 76.27% (76.56%); H, 8.31% (8.57%); N, 14.78% (14.88%).

Molecular Weight (MW): 188.27.

FT-IR (nujol): 1646 cm$^{-1}$ $v_{(C=N)}$.

Example 4

Synthesis of the Ligand Having Formula (L4)

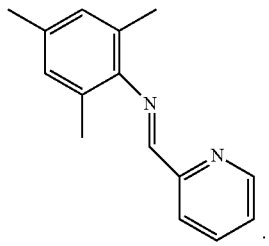

(L4)

In a reactor of 500 ml equipped with a magnetic stirrer, 9.96 g (93 mmoles) of 2-pyridinecarboxyaldehyde were placed together with 100 ml of methanol, some drops of formic acid and 12.6 g (93 mmoles) of 2,4,6-trimethylaniline: the mixture obtained was left, under stirring, at room temperature, for 48 hours. Then, anhydrous sodium sulfate was added and the whole was left, under stirring, at room temperature, for 30 minutes. At the end, the whole was filtered, the methanol was removed by distillation at reduced pressure and the yellow oily product obtained was purified by elution on silica gel chromatographic column [eluent: heptane/ethyl acetate mixture in a ratio 90/10 (v/v)], and crystallized from cold ethyl ether obtaining 17 g of a crystalline light-yellow product (yield=81%) having formula (L4).

Elementary analysis [found (calculated for $C_{15}H_{16}N_2$)]: C, 80.27% (80.32%); H, 7.31% (7.19%); N, 12.68% (12.49%).

Molecular Weight (MW): 224.30.

FT-IR (nujol): 1640 cm$^{-1}$ $v_{(C=N)}$.

Example 5

Synthesis of the VCl$_3$(L1)(THF) Complex [GL890 Sample]

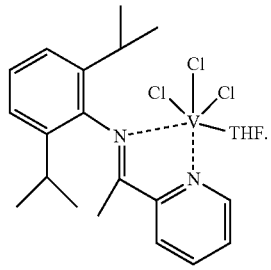

(GL890)

The vanadium(III)chloride(tris-tetrahydrofuran) [VCl$_3$(THF)$_3$] (1.05 g; 2.8 mmoles) was introduced into a tailed flask of 100 ml together with toluene (40 ml). Then, a solution of the ligand having formula (L1) (0.790 g; 2.8 mmoles; molar ratio L1/V=1), obtained as described in Example 1, in toluene (15 ml), was added. The mixture obtained was maintained, under stirring, at room temperature, for 48 hours, then the volume of the mixture was reduced to about 10 ml by evaporation, under vacuum, at room temperature and, then, pentane was added (50 ml). An orange/brownish solid precipitate was formed, which was recovered by filtration, washed with pentane (2×5 ml) and dried under vacuum, at room temperature, obtaining 1.197 g (yield=83.9%) of an orange/brownish solid product corresponding to the VCl$_3$(L1)(THF) complex.

Elementary analysis [found (calculated for $C_{23}H_{32}Cl_3N_2OV$)]: C, 54.3% (54.19%); H, 6.1% (6.33%); Cl, 21.0% (20.86%); N, 5.4% (5.49%); V, 10.2% (9.99%).

Molecular Weight (MW): 509.81.

Example 6

Synthesis of the VCl$_3$(L2)(THF) Complex [ZG57 Sample]

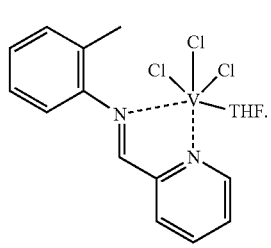

(ZG57)

The vanadium(III)chloride(tris-tetrahydrofuran) [VCl$_3$(THF)$_3$] (0.583 g; 1.55 mmoles) was introduced into a tailed flask of 100 ml together with toluene (20 ml). Then, a solution of the ligand having formula (L2) (0.304 g; 1.55 mmoles; molar ratio L2/V=1), obtained as described in Example 2, in toluene (10 ml), was added. The mixture obtained was maintained, under stirring, at room temperature, for 48 hours, then the volume of the mixture was reduced to about 10 ml by evaporation, under vacuum, at room temperature and, then, pentane was added (50 ml). An orange solid precipitate formed which was recovered by filtration, washed with pentane (2×5 ml) and dried under vacuum, at room temperature, obtaining 0.430 g (yield=65%) of an orange solid product corresponding to the VCl$_3$(L2) (THF) complex.

Elementary analysis [found (calculated for C$_{17}$H$_{20}$Cl$_3$N$_2$OV)]: C, 47.8% (47.97%); H, 4.8% (4.74%); Cl, 25.2% (24.99%); N, 6.8% (6.58%); V, 12.2% (11.97%).

Molecular Weight (MW): 425.65.

Example 7

Synthesis of the VCl$_3$(L3)(THF) Complex [IP91 Sample]

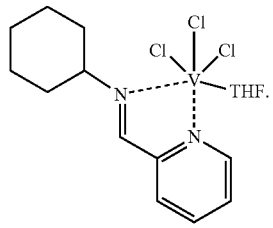

(IP91)

The vanadium(III)chloride(tris-tetrahydrofuran) [VCl$_3$(THF)$_3$] (0.498 g; 1.33 mmoles) was introduced into a tailed flask of 100 ml together with toluene (16 ml). Then, a solution of the ligand having formula (L3) (0.250 g; 1.33 mmoles; molar ratio L3/V=1), obtained as described in Example 3, in toluene (6 ml), was added. The mixture obtained was maintained, under stirring, at room temperature, for 48 hours, then the volume of the mixture was reduced to about 10 ml by evaporation, under vacuum, at room temperature and, then, pentane was added (50 ml). An orange solid precipitate was formed, which was recovered by filtration, washed with pentane (2×5 ml) and dried under vacuum, at room temperature, obtaining 0.361 g (yield=65%) of an orange solid product corresponding to the VCl$_3$(L3) (THF) complex.

Elementary analysis [found (calculated for C$_{16}$H$_{24}$Cl$_3$N$_2$OV)]: C, 46.3% (46.01%); H, 5.8% (5.79%); Cl, 25.6% (25.46%); N, 6.6% (6.71%); V, 12.4% (12.20%).

Molecular Weight (MW): 417.68.

Example 8

Synthesis of the VCl$_3$(L4) (THF) Complex [GL1442 Sample]

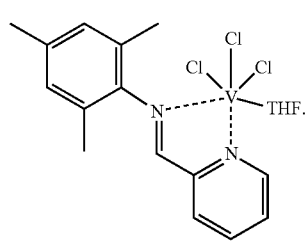

(GL1442)

The vanadium (III) chloride (tris-tetrahydrofuran) [VCl$_3$(THF)$_3$] (0.951 g; 2.54 mmoles) was introduced into a tailed flask of 100 ml together with toluene (25 ml). Then, a solution of the ligand having formula (L4) (0.560 g; 2.54 mmoles; molar ratio L4/V=1), obtained as described in Example 4, in toluene (10 ml), was added. The mixture obtained was maintained, under stirring, at room temperature, for 48 hours, then the volume of the mixture was reduced to about 10 ml by evaporation, under vacuum, at room temperature and, then, pentane was added (60 ml). An orange solid precipitate was formed, which was recovered by filtration, washed with pentane (2×5 ml) and dried under vacuum, at room temperature, obtaining 0.820 g (yield=71.2%) of an orange solid product corresponding to the VCl$_3$(L4)(THF) complex.

Elementary analysis [found (calculated for C$_{19}$H$_{24}$Cl$_3$N$_2$OV)]: C, 50.4% (50.30%); H, 5.5% (5.33%); Cl, 23.6% (23.44%); N, 6.0% (6.17%); V, 11.4% (12.23%).

Molecular Weight (MW): 453.71.

In FIG. 1 the FT-IR spectrum (solid state, UATR) of the polybutadiene obtained (Absorbance; Wavenumbers) is reported.

Example 9 (GL881)

2 ml of 1,3-butadiene equal to about 1.4 g were cold condensed (−20° C.) in a test tube of 25 ml. Then, 7.15 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L1)(THF) complex (sample GL890) (2.55 ml of toluene suspension at a concentration equal to 2 mg/ml; 1×10$^{-5}$ moles, equal to about 5.1 mg) obtained as described in Example 5. The whole was maintained, under magnetic stirring, at 20° C., for 24 hours. The polymerization was then stopped by adding 2 ml of methanol containing some drops of hydrochloric acid. The obtained polymer was then coagulated by adding 40 ml of a methanol solution containing 4% of Irganox® 1076 (Ciba) antioxidant obtaining 1.256 g of polybutadiene having mainly cis-1,4 structure (content of cis-1,4 units equal to 72%) (conversion equal to 89.7%): further characteristics of the process and of the polybutadiene obtained are reported in Table 1.

Figure 2:
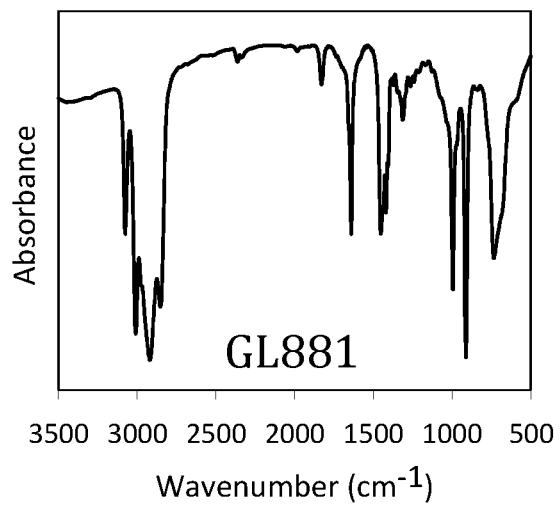
FIG. 2 shows the FT-IR spectrum of the obtained polybutadiene (Absorbance; Wavenumbers).

In FIG. 2 the FT-IR spectrum of the polybutadiene obtained (Absorbance; Wavenumbers) is reported.

Example 10 (GL884)

2 ml of 1,3-butadiene equal to about 1.4 g were cold condensed (−20° C.) in a test tube of 25 ml. Then, 7.15 ml of toluene were added and the temperature of the solution thus obtained was brought to 20° C. Then, dry-methylaluminoxane (MAO-dry) in toluene solution (6.3 ml; 1.0×10$^{-2}$ moles, equal to about 0.58 g) was added and, then, the VCl$_3$(L1)(THF) complex (sample GL890) (2.55 ml of toluene suspension at a concentration equal to 2 mg/ml; 1×10$^{-5}$ moles, equal to about 5.1 mg) obtained as described in Example 5. The whole was maintained, under magnetic stirring, at 20° C., for 5 hours. The polymerization was then stopped by adding 2 ml of methanol containing some drops of hydrochloric acid. The obtained polymer was then coagulated by adding 40 ml of a methanol solution containing 4% of Irganox® 1076 (Ciba) antioxidant obtaining 0.477 g of polybutadiene having mainly cis-1,4 structure (content of cis-1,4 units equal to 83%) (conversion equal to 34.1%): further characteristics of the process and of the polybutadiene obtained are reported in Table 1.

Figure 3:
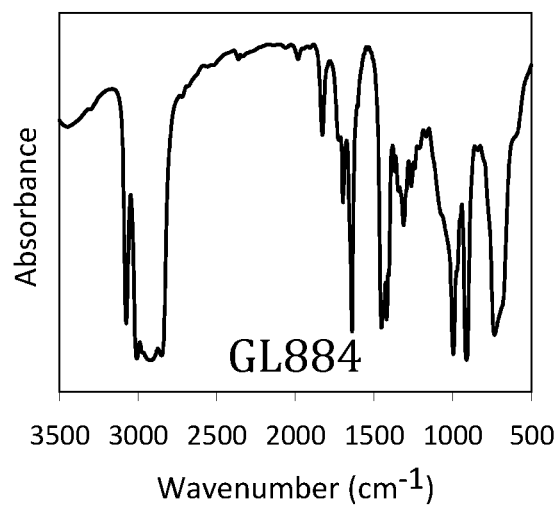
FIG. 3 shows the FT-IR spectrum of the obtained polybutadiene (Absorbance; Wavenumbers).

In FIG. 3 the FT-IR spectrum of the obtained polybutadiene (Absorbance; Wavenumbers) is reported.

Figure 4:
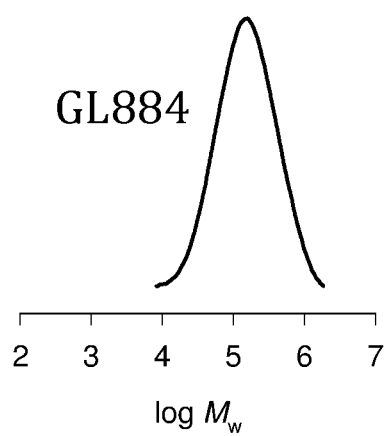
FIG. 4 shows the curve GPC ("Gel Permeation Chromatography") of the obtained polybutadiene.

In FIG. 4 the curve GPC ("Gel Permeation Chromatography") of the polybutadiene obtained is reported.

Example 11 (GL883)

2 ml of 1,3-butadiene equal to about 1.4 g were cold condensed (−20° C.) in a test tube of 25 ml. Then, 7.25 ml of toluene were added and the temperature of the solution thus obtained was brought to 20° C. Then, tetra-iso-butyl-aluminoxane (TIBAO) in a cyclohexane solution at 30% by weight (6.21 ml; $1.0 \times 10^{-2}$ moles, equal to about 2.98 g) was added and, then, the $VCl_3(L1)$ (THF) complex (sample GL890) (2.55 ml of toluene suspension at a concentration equal to 2 mg/ml; $1 \times 10^{-5}$ moles, equal to about 5.1 mg) obtained as described in Example 5. The whole was maintained, under magnetic stirring, at 20° C., for 24 hours. The polymerization was then stopped by adding 2 ml of methanol containing some drops of hydrochloric acid. The obtained polymer was then coagulated by adding 40 ml of a methanol solution containing 4% of Irganox® 1076 (Ciba) antioxidant obtaining 0.477 g of polybutadiene having mainly cis-1,4 structure (content of cis-1,4 units equal to 70%) (conversion equal to 64.5%): further characteristics of the process and of the polybutadiene obtained are reported in Table 1.

Example 12 (GL892)

2 ml of 1,3-butadiene equal to about 1.4 g were cold condensed (−20° C.) in a test tube of 25 ml. Then, 7.15 ml of toluene were added and the temperature of the solution thus obtained was brought to 20° C. Then, modified methylaluminoxane (MAO-modified) in toluene solution (6.3 ml; $1.0 \times 10^{-2}$ moles, equal to about 0.58 g) was added and, then, the $VCl_3(L1)$ (THF) complex (sample GL890) (2.2 ml of toluene suspension at a concentration equal to 2 mg/ml; $1 \times 10^{-5}$ moles, equal to about 5.1 mg) obtained as described in Example 5. The whole was maintained, under magnetic stirring, at 20° C., for 30 minutes. The polymerization was then stopped by adding 2 ml of methanol containing some drops of hydrochloric acid. The obtained polymer was then coagulated by adding 40 ml of a methanol solution containing 4% of Irganox® 1076 (Ciba) antioxidant obtaining 0.825 g of polybutadiene having mainly cis-1,4 structure (content of cis-1,4 units equal to 82%) (conversion equal to 58.9%): further characteristics of the process and of the polybutadiene obtained are reported in Table 1.

Figure 5:
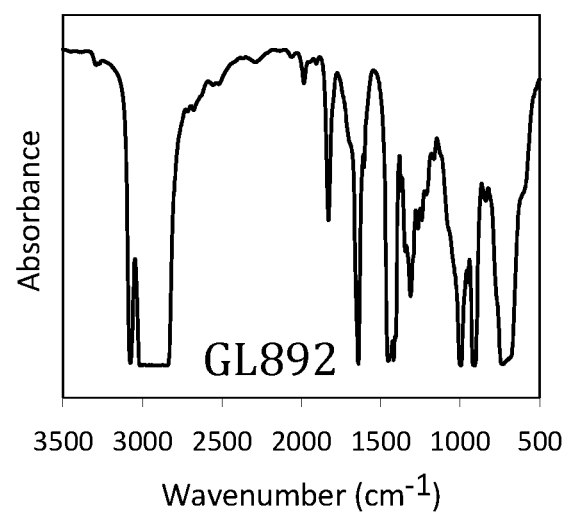
FIG. 5 shows the FT-IR spectrum of the obtained polybutadiene (Absorbance; Wavenumbers).

In FIG. 5 the FT-IR spectrum of the polybutadiene obtained (Absorbance; Wavenumbers) is reported.

Example 13 (ZG58)

2 ml of 1,3-butadiene equal to about 1.4 g were cold condensed (−20° C.) in a test tube of 25 ml. Then, 7.55 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the $VCl_3(L2)$ (THF) complex (sample ZG57) (2.15 ml of toluene suspension at a concentration equal to 2 mg/ml; $1 \times 10^{-5}$ moles, equal to about 4.3 mg) obtained as described in Example 6. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.372 g of polybutadiene having a mixed structure (conversion equal to 26.6%): further characteristics of the process and of the polybutadiene obtained are reported in Table 1.

Figure 6:
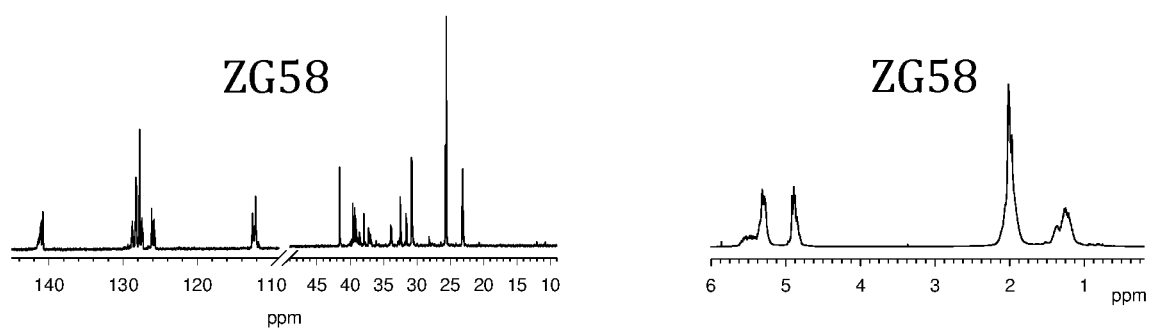
FIG. 6 shows the $^1$H-NMR (above) and $^{13}$C-NMR (below) spectra of the obtained polybutadiene.

In FIG. 6 the $^1$H-NMR (above) and $^{13}$C-NMR (below) spectra of the polybutadiene obtained are reported.

Example 14 (ZG59)

2 ml of 1,3-butadiene equal to about 1.4 g were cold condensed (−20° C.) in a test tube of 25 ml. Then, 7.55 ml of toluene were added and the temperature of the solution thus obtained was brought to 20° C. Then, dry-methylaluminoxane (MAO-dry) in toluene solution (6.3 ml; $1.0 \times 10^{-2}$ moles, equal to about 0.58 g) was added and, then, the $VCl_3(L2)$ (THF) complex (sample ZG57) (2.15 ml of toluene suspension at a concentration equal to 2 mg/ml; $1 \times 10^{-5}$ moles, equal to about 4.3 mg) obtained as described in Example 6. The whole was maintained, under magnetic stirring, at 20° C., for 3 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 1.06 g of polybutadiene having a mixed structure (conversion equal to 75.7%): further characteristics of the process and of the polybutadiene obtained are reported in Table 1.

Figure 7:
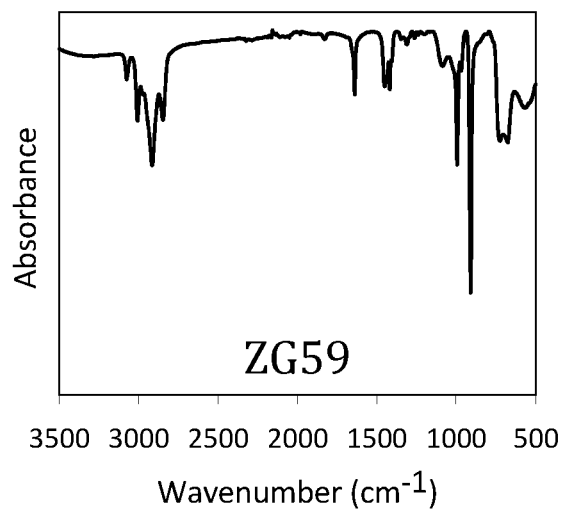
FIG. 7 shows the FT-IR spectrum of the obtained polybutadiene (Absorbance; Wavenumbers).

In FIG. 7 the FT-IR spectrum of the polybutadiene obtained (Absorbance; Wavenumbers) is reported.

Figure 8:
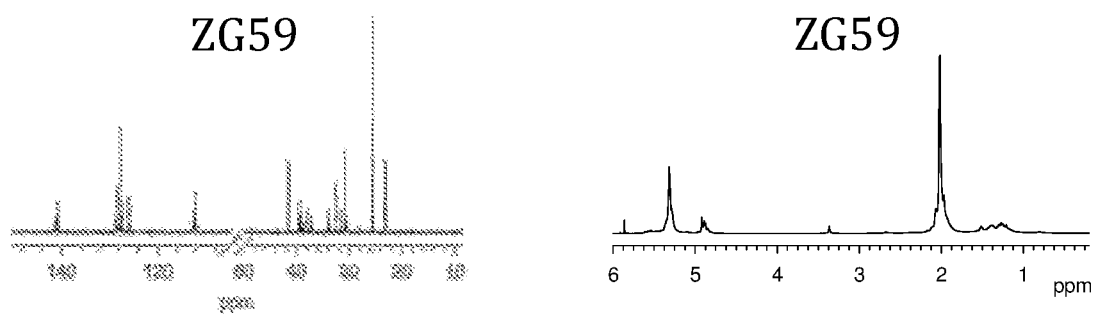
FIG. 8 shows the $^1$H-NMR (above) and $^{13}$C-NMR (below) spectra of the obtained polybutadiene.

In FIG. 8 the $^1$H-NMR (above) and $^{13}$C-NMR (below) spectra of the polybutadiene obtained are reported.

Example 15 (IP96)

2 ml of 1,3-butadiene equal to about 1.4 g were cold condensed (−20° C.) in a test tube of 25 ml. Then, 7.6 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the $VCl_3(L3)$ (THF) complex (sample IP91) (2.1 ml of toluene suspension at a concentration equal to 2 mg/ml; $1 \times 10^{-5}$ moles, equal to about 4.2 mg) obtained as described in Example 7. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.527 g of polybutadiene having a mixed structure (conversion equal to 37.6%): further characteristics of the process and of the polybutadiene obtained are reported in Table 1.

Figure 9:
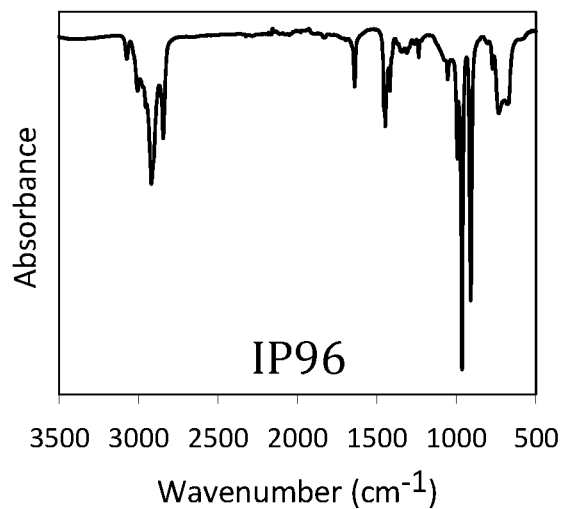
FIG. 9 shows the FT-IR spectrum of the obtained polybutadiene (Absorbance; Wavenumbers).

In FIG. 9 the FT-IR spectrum of the polybutadiene obtained (Absorbance; Wavenumbers) is reported.

Example 16 (IP97)

2 ml of 1,3-butadiene equal to about 1.4 g were cold condensed (−20° C.) in a test tube of 25 ml. Then, 7.6 ml of toluene were added and the temperature of the solution thus obtained was brought to 20° C. Then, dry-methylaluminoxane (MAO-dry) in toluene solution (6.3 ml; $1.0 \times 10^{-2}$ moles, equal to about 0.58 g) was added and, then, the $VCl_3(L3)$ (THF) complex (sample IP91) (2.1 ml of toluene suspension at a concentration equal to 2 mg/ml; 1×10−5 moles, equal to about 4.2 mg) obtained as described in Example 7. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.743 g of polybutadiene having a mixed structure (conversion equal to 53.1%): further characteristics of the process and of the polybutadiene obtained are reported in Table 1.

Figure 10:
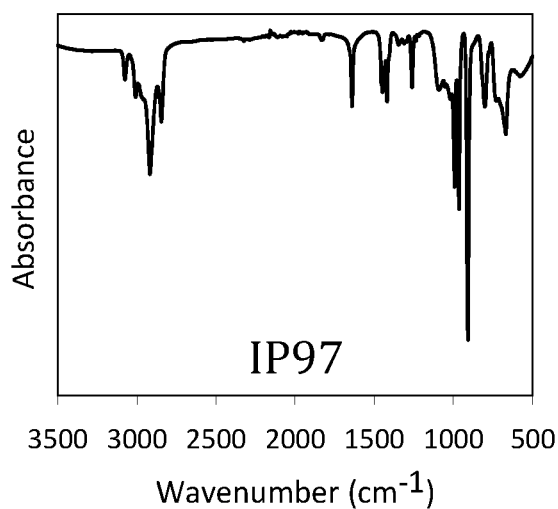
FIG. 10 shows the FT-IR spectrum of the obtained polybutadiene (Absorbance; Wavenumbers).

In FIG. 10 the FT-IR spectrum of the polybutadiene obtained (Absorbance; Wavenumbers) is reported.

Figure 11:
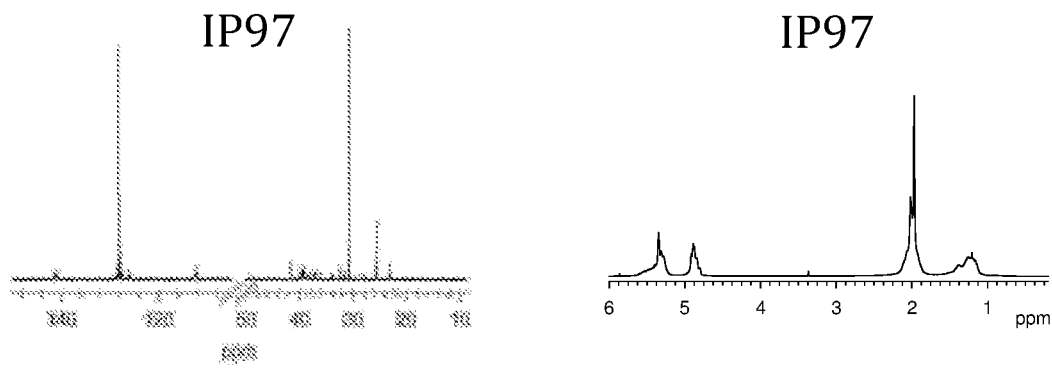
FIG. 11 shows the $^1$H-NMR (above) and $^{13}$C-NMR (below) spectra of the obtained polybutadiene.

In FIG. 11 the $^1$H-NMR (above) and $^{13}$C-NMR (below) spectra of the polybutadiene obtained are reported.

Example 17 (IP92)

2 ml of 1,3-butadiene equal to about 1.4 g were cold condensed (−20° C.) in a test tube of 25 ml. Then, 7.45 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the VCl$_3$(L4)(THF) complex (sample GL1442) (2.25 ml of toluene suspension at a concentration equal to 2 mg/ml; $1 \times 10^{-5}$ moles, equal to about 4.5 mg) obtained as described in Example 8. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.756 g of polybutadiene having a mixed structure (conversion equal to 54.0%): further characteristics of the process and of the polybutadiene obtained are reported in Table 1.

Figure 12:
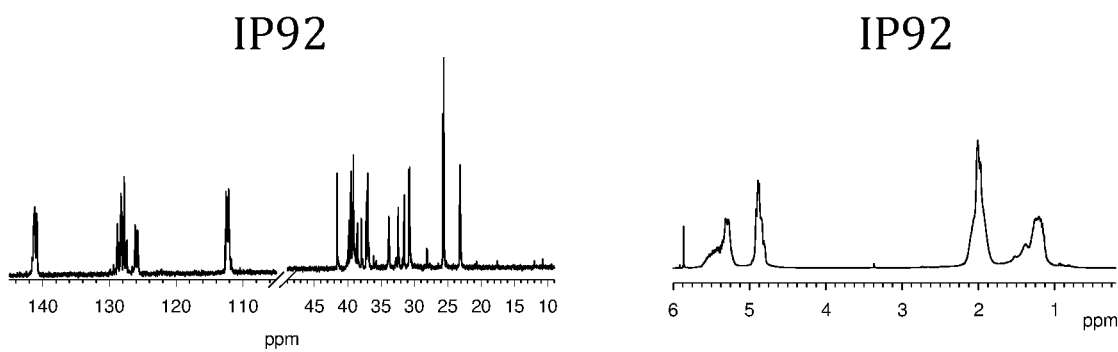
FIG. 12 shows the H-NMR (above) and $^{13}$C-NMR (below) spectra of the obtained polybutadiene.

In FIG. 12 the $^1$H-NMR (above) and $^{13}$C-NMR (below) spectra of the polybutadiene obtained are reported.

Example 18 (IP93)

2 ml of 1,3-butadiene equal to about 1.4 g were cold condensed (−20° C.) in a test tube of 25 ml. Then, 7.45 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the VCl$_3$(L4)(THF) complex (sample GL1442) (2.25 ml of toluene suspension at a concentration equal to 2 mg/ml; $1 \times 10^{-5}$ moles, equal to about 4.5 mg) obtained as described in Example 8. The whole was maintained, under magnetic stirring, at 20° C., for 5 hours. The polymerization was then stopped by adding 2 ml of methanol containing some drops of hydrochloric acid.

The obtained polymer was then coagulated by adding 40 ml of a methanol solution containing 4% of Irganox®1076 (Ciba) antioxidant obtaining 1.14 g of polybutadiene having a mixed structure (conversion equal to 81.4%): further characteristics of the process and of the polybutadiene obtained are reported in Table 1.

Figure 13:
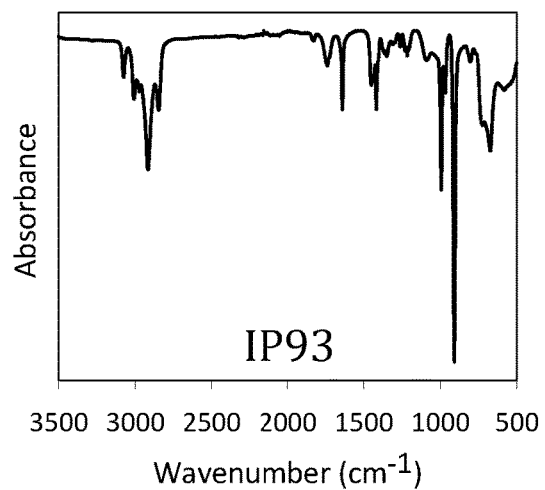
FIG. 13 shows the FT-IR spectrum of the obtained polybutadiene (Absorbance; Wavenumbers).

In FIG. 13 the FT-IR spectrum of the polybutadiene obtained (Absorbance; Wavenumbers) is reported.

Example 19 (GR001)

2 ml of isoprene equal to about 1.36 g were introduced in a test tube of 25 ml. Then, 7.15 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, then, the VCl$_3$(L1)(THF) complex (sample GL890) (2.55 ml of toluene suspension at a concentration equal to 2 mg/ml; 1×10−5 moles, equal to about 5.1 mg) obtained as described in Example 5. The whole was maintained, under magnetic stirring, at 20° C., for 12 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.985 g of polyisoprene having mainly cis-1,4 structure (content of cis-1,4 units equal to 79.6%) (conversion equal to 72.4%): further characteristics of the process and of the polyisoprene obtained are reported in Table 2.

Example 20 (GR002)

2 ml of isoprene equal to about 1.36 g were introduced in a test tube of 25 ml. Then, 7.15 ml of toluene were added and the temperature of the solution thus obtained was brought to 20° C. Then, dry-methylaluminoxane (MAO-dry) in toluene solution (6.3 ml; $1 \times 10^{-2}$ moles, equal to about 0.58 g) was added and, then, the VCl$_3$(L1) (THF) complex (sample GL890) (2.55 ml of toluene suspension at a concentration equal to 2 mg/ml; 1×10−5 moles, equal to about 5.1 mg) obtained as described in Example 5. The whole was maintained, under magnetic stirring, at 20° C., for 2 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 1.098 g of polyisoprene having mainly cis-1,4 structure (content of cis-1,4 units equal to 83.8%) (conversion equal to 80.7%): further characteristics of the process and of the polyisoprene obtained are reported in Table 2.

Example 21 (ZG60)

2 ml of isoprene equal to about 1.36 g were introduced in a test tube of 25 ml. Then, 7.55 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, then, the VCl$_3$(L2) (THF) complex (sample ZG57) (2.15 ml of toluene suspension at a concentration equal to 2 mg/ml; $1 \times 10^{-5}$ moles, equal to about 4.3 mg) obtained as described in Example 6. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.450 g of polyisoprene having mainly cis-1,4 structure (content of cis-1,4 units equal to 69.1%) (conversion equal to 33.1%): further characteristics of the process and of the polyisoprene obtained are reported in Table 2.

Figure 14:
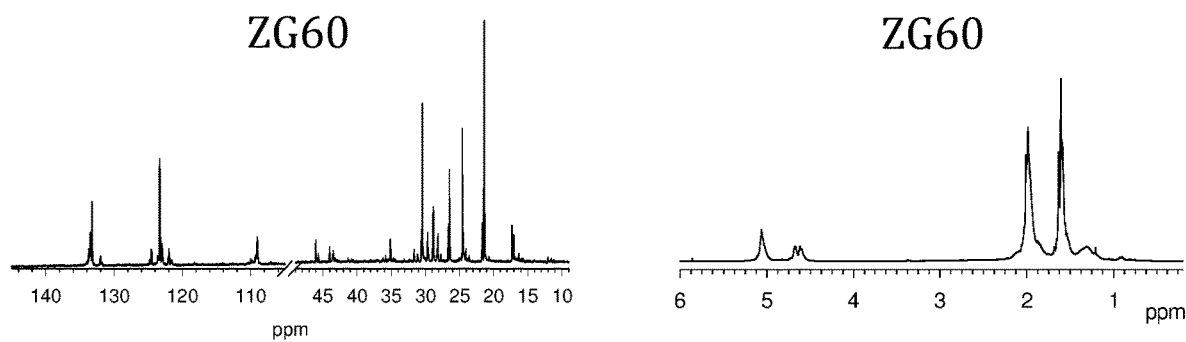
FIG. 14 shows the $^1$H-NMR (above) and $^{13}$C-NMR (below) spectra of the obtained polyisoprene.

In FIG. 14 the $^1$H-NMR (above) and $^{13}$C-NMR (below) spectra of the polyisoprene obtained are reported.

Example 22 (ZG61)

2 ml of isoprene equal to about 1.36 g were introduced in a test tube of 25 ml. Then, 7.55 ml of toluene were added and the temperature of the solution thus obtained was brought to 20° C. Then, methylaluminoxane (MAO) in toluene solution (6.3 ml; 1×10⁻² moles, equal to about 0.58 g) was added and, then, the VCl₃(L2) (THF) complex (sample ZG57) (2.15 ml of toluene suspension at a concentration equal to 2 mg/ml; 1×10−5 moles, equal to about 4.3 mg) obtained as described in Example 6. The whole was maintained, under magnetic stirring, at 20° C., for 3 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.821 g of polyisoprene having mainly cis-1,4 structure (content of 1,4-cis units equal to 71.3%) (conversion equal to 60.4%): further characteristics of the process and of the polyisoprene obtained are reported in Table 2.

Figure 15:
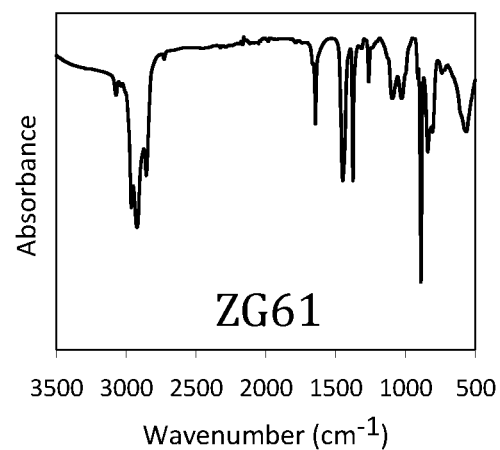
FIG. 15 shows the FT-IR spectrum of the obtained polyisoprene (Absorbance; Wavenumbers).

In FIG. 15 the FT-IR spectrum of the polyisoprene obtained (Absorbance; Wavenumbers) is reported.

Figure 16:
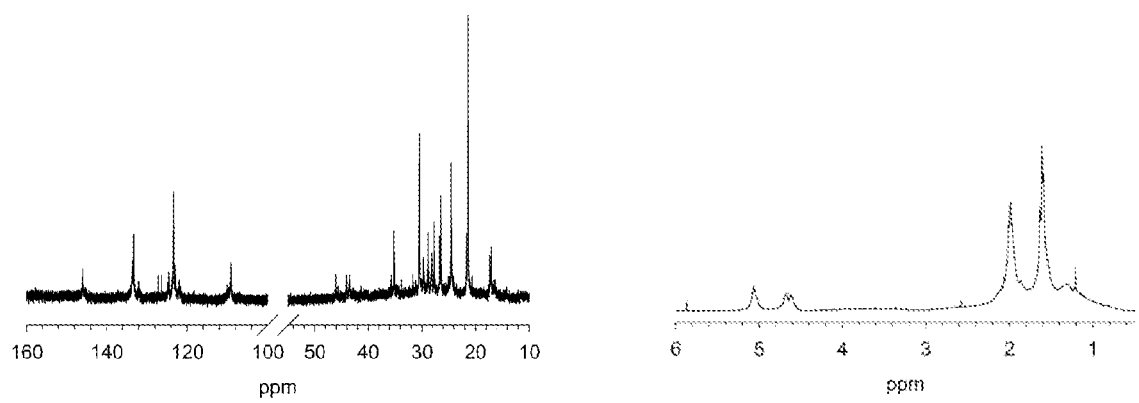
FIG. 16 shows the $^1$H-NMR (above) and $^{13}$C-NMR (below) spectra of the obtained polyisoprene.

In FIG. 16 the ¹H-NMR (above) and ¹³C-NMR (below) spectra of the polyisoprene obtained are reported.

Figure 17:
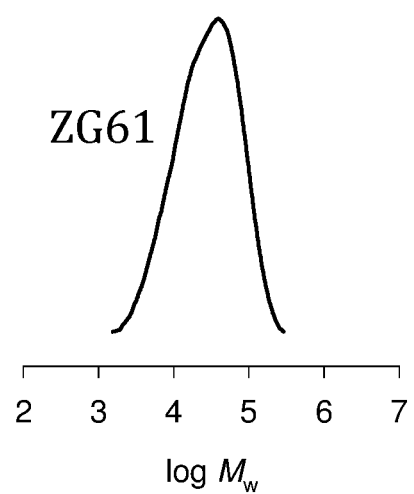
FIG. 17 shows the GPC curve ("Gel Permeation Chromatography") of the obtained polyisoprene.

In FIG. 17 the GPC curve ("Gel Permeation Chromatography") of the polyisoprene obtained is reported.

Example 23 (IP98)

2 ml of isoprene equal to about 1.36 g were introduced in a test tube of 25 ml. Then, 7.6 ml of toluene were added and the temperature of the solution thus obtained was brought to 20° C. Then, methylaluminoxane (MAO) in toluene solution (6.3 ml; 1×10⁻² moles, equal to about 0.58 g) was added and, then, the VCl₃(L3) complex (sample IP91) (2.1 ml of toluene suspension at a concentration equal to 2 mg/ml; 1×10−5 moles, equal to about 4.2 mg) obtained as described in Example 7. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.198 g of polyisoprene having mainly cis-1,4 structure (content of cis-1,4 units equal to 68.5%) (conversion equal to 14.6%): further characteristics of the process and of the polyisoprene obtained are reported in Table 2.

Example 24 (IP99)

2 ml of isoprene equal to about 1.36 g were introduced in a test tube of 25 ml. Then, 7.6 ml of toluene were added and the temperature of the solution thus obtained was brought to 20° C. Then, dry-methylaluminoxane (MAO-dry) in toluene solution (6.3 ml; 1×10⁻² moles, equal to about 0.58 g) was added and, then, the VCl₃(L3) (THF) complex (sample IP91) (2.1 ml of toluene suspension at a concentration equal to 2 mg/ml; 1×10⁻⁵ moles, equal to about 4.2 mg) obtained as described in Example 7. The whole was maintained, under magnetic stirring, at 20° C., for 6 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 0.413 g of polyisoprene having mainly cis-1,4 structure (content of cis-1,4 units equal to 70.9%) (conversion equal to 30.4%): further characteristics of the process and of the polyisoprene obtained are reported in Table 2.

Figure 18:
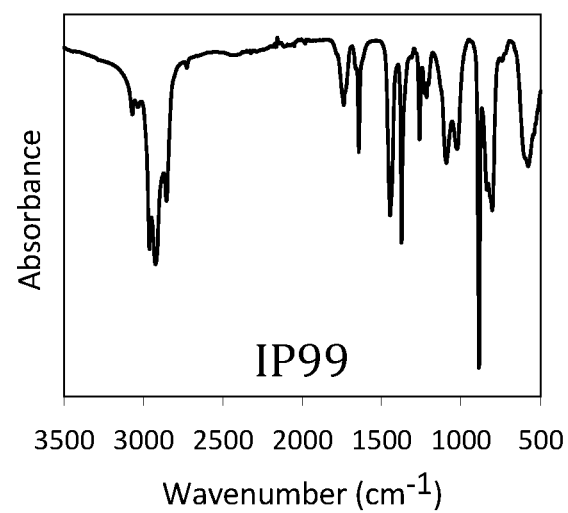
FIG. 18 shows the FT-IR spectrum of the obtained polyisoprene (Absorbance; Wavenumbers).

In FIG. 18 the FT-IR spectrum of the polyisoprene obtained (Absorbance; Wavenumbers) is reported.

Example 25 (IP94)

2 ml of isoprene equal to about 1.36 g were introduced in a test tube of 25 ml. Then, 7.45 ml of toluene were added and the temperature of the solution thus obtained was brought to 20° C. Then, methylaluminoxane (MAO) in toluene solution (6.3 ml; 1×10⁻² moles, equal to about 0.58 g) was added and, then, the VCl₃(L4) (THF) complex (sample GL1442) (2.25 ml of toluene suspension at a concentration equal to 2 mg/ml; 1×10−5 moles, equal to about 4.5 mg) obtained as described in Example 8. The whole was maintained, under magnetic stirring, at 20° C., for 24 hours. The polymerization was then stopped by adding 2 ml of methanol containing some drops of hydrochloric acid.

The obtained polymer was then coagulated by adding 40 ml of a methanol solution containing 4% of Irganox® 1076 (Ciba) antioxidant obtaining 1.008 g of polyisoprene having mainly cis-1,4 structure (content of cis-1,4 units equal to 70.1%) (conversion equal to 74.1%): further characteristics of the process and of the polyisoprene obtained are reported in Table 2.

Example 26 (IP95)

2 ml of isoprene equal to about 1.36 g were introduced in a test tube of 25 ml. Then, 7.45 ml of toluene were added and the temperature of the solution thus obtained was brought to 20° C. Then, methylaluminoxane (MAO) in toluene solution (6.3 ml; 1×10⁻² moles, equal to about 0.58 g) was added and, then, the VCl₃(L4) (THF) complex (sample GL1442) (2.25 ml of toluene suspension at a concentration equal to 2 mg/ml; 1×10⁻⁵ moles, equal to about 4.5 mg) obtained as described in Example 8. The whole was maintained, under magnetic stirring, at 20° C., for 5 hours. The polymerization was then stopped by adding 2 ml of methanol containing some drops of hydrochloric acid. The obtained polymer was then coagulated by adding 40 ml of a methanol solution containing 4% of Irganox® 1076 (Ciba) antioxidant obtaining 0.401 g of polyisoprene having mainly cis-1,4 structure (content of cis-1,4 units equal to 71.3%) (conversion equal to 29.5%): further characteristics of the process and of the polyisoprene obtained are reported in Table 2.

Figure 19:
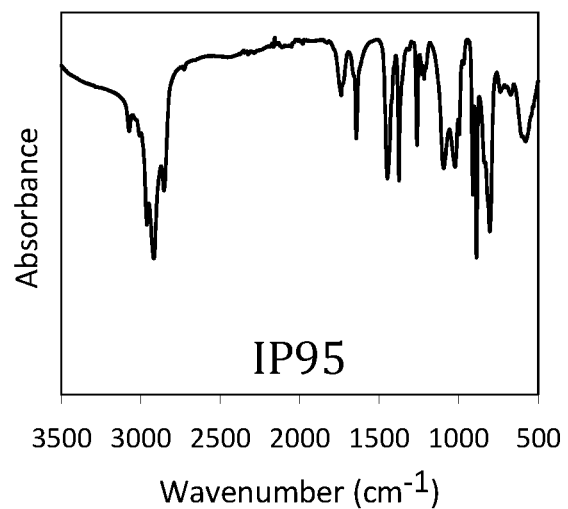
FIG. 19 shows the FT-IR spectrum of the obtained polyisoprene (Absorbance; Wavenumbers).

In FIG. 19 the FT-IR spectrum of the polyisoprene obtained (Absorbance; Wavenumbers) is reported.

Figure 20:
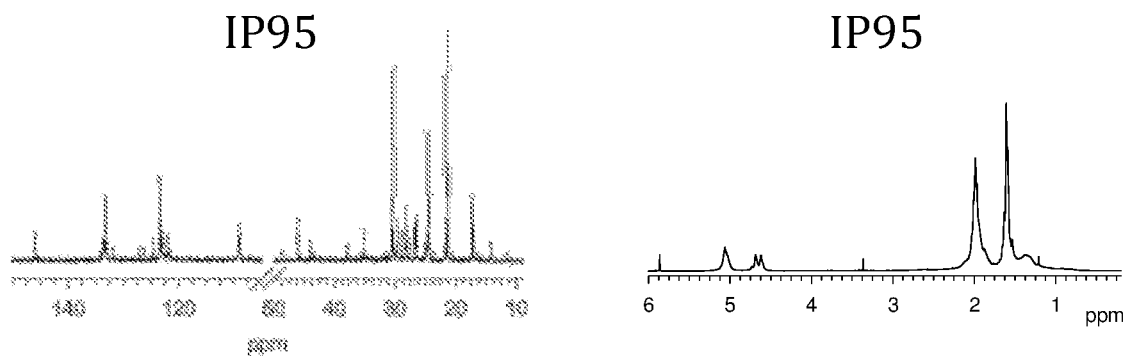
FIG. 20 shows the $^1$H-NMR (above) and $^{13}$C-NMR (below) spectra of the obtained polyisoprene.

In FIG. 20 the ¹H-NMR (above) and ¹³C-NMR (below) spectra of the polyisoprene obtained are reported.

TABLE 1

Polymerization of 1,3-butadiene with catalytic systems comprising vanadium pyridine-imine complexes

| Example | Time (hours) | Conversion (%) | cis-1,4 (%) | trans-1,4 (%) | 1,2 (%) | $M_w$ (g × mol⁻¹) | $M_w/M_n$ |
|---|---|---|---|---|---|---|---|
| 9 | 24 | 89.7 | 72.0 | 0 | 28.0 | 157500 | 2.4 |
| 10 | 5 | 34.1 | 83.0 | 0 | 17.0 | 227000 | 2.2 |

TABLE 1-continued

Polymerization of 1,3-butadiene with catalytic systems
comprising vanadium pyridine-imine complexes

| Example | Time (hours) | Conversion (%) | cis-1,4 (%) | trans-1,4 (%) | 1,2 (%) | $M_w$ (g × mol$^{-1}$) | $M_w/M_n$ |
|---|---|---|---|---|---|---|---|
| 11 | 24 | 64.5 | 70.0 | 0 | 30.0 | 163800 | 2.5 |
| 12 | 0.5 | 58.9 | 82.0 | 0 | 18.0 | 39000 | 2.0 |
| 13 | 24 | 26.6 | 24.8 | 11.6 | 63.6 | 60900 | 3.1 |
| 14 | 3 | 75.7 | 14.7 | 29.5 | 55.8 | 80100 | 2.6 |
| 15 | 24 | 37.6 | 26.7 | 18.8 | 54.5 | 38300 | 3.5 |
| 16 | 24 | 53.1 | 7.6 | 42.7 | 49.7 | 57700 | 2.9 |
| 17 | 24 | 54.0 | 25.7 | 14.5 | 59.8 | 49700 | 3.2 |
| 18 | 5 | 81.4 | 12.6 | 34.8 | 52.6 | 68000 | 2.6 |

TABLE 2

Polymerization of isoprene with catalytic systems
comprising oxo-nitrogen vanadium complexes

| Example | Time (hour) | Conversion (%) | cis-1,4 (%) | trans-1,4 (%) | 3,4 (%) | $M_w$ (g × mol$^{-1}$) | $M_w/M_n$ |
|---|---|---|---|---|---|---|---|
| 19 | 12 | 72.4 | 79.6 | 0 | 20.4 | 46500 | 2.6 |
| 20 | 2 | 80.7 | 83.8 | 0 | 16.2 | 55000 | 2.2 |
| 21 | 24 | 33.1 | 69.1 | 0 | 30.9 | 32700 | 2.7 |
| 22 | 3 | 60.4 | 71.3 | 0 | 28.7 | 41000 | 2.3 |
| 23 | 24 | 14.6 | 68.5 | 0 | 31.5 | 20600 | 3.8 |
| 24 | 6 | 30.4 | 70.9 | 0 | 29.1 | 22400 | 3.5 |
| 25 | 24 | 74.1 | 70.1 | 0 | 29.9 | 19400 | 3.2 |
| 26 | 5 | 29.5 | 71.3 | 0 | 28.7 | 20100 | 3.0 |

The invention claimed is:

1. A vanadium pyridine-imine complex having a formula (I):

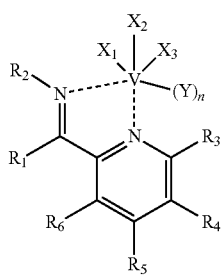

(I)

wherein:
$R_1$, $R_2$, $R_3$, $R_4$, $R_5$ and $R_6$ each independently represent an optionally halogenated linear or branched $C_1$-$C_{15}$ alkyl group $X_1$, $X_2$ and $X_3$ each independently represent a halogen atom, a linear or branched $C_1$-$C_{20}$ alkyl group, a —$OCOR_7$ group or a —$OR_7$ group, wherein $R_7$ is a linear or branched $C_1$-$C_{20}$ alkyl group;

Y is diethylether, tetrahydrofuran (THF), or dimethoxyethane; and n is 0 or 1, with the proviso that when n is 0, $R_2$ is an optionally substituted cycloalkyl group.

2. The vanadium pyridine-imine complex of claim 1, wherein:
$X_1$, $X_2$ and $X_3$, each independently represent a halogen atom;
Y is tetrahydrofuran (THF); and
n is 1.

3. A catalytic system for (co)polymerization of conjugated dienes, comprising:

(a) the vanadium pyridine-imine complex of claim 1; and
(b) a co-catalyst that is an aluminum organo-derivative compound.

4. The catalytic system of claim 3, wherein the co-catalyst comprises an aluminoxane having a formula (III):

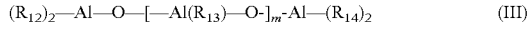

(III)

wherein $R_{12}$, $R_{13}$ and $R_{14}$ each independently represent a hydrogen atom, a halogen atom, or a linear or branched $C_1$-$C_{20}$ alkyl group, cycloalkyl group, or aryl group, optionally substituted with one or more silicon or germanium atoms; and m is an integer of 0 to 1000.

5. A process of (co)polymerizing conjugated dienes, comprising (co)polymerizing one or more conjugated dienes with a catalytic system comprising:
(a) a vanadium pyridine-imine complex; and
(b) a co-catalyst that is an aluminum organo-derivative compound,
wherein the vanadium pyridine-imine complex having a formula (I):

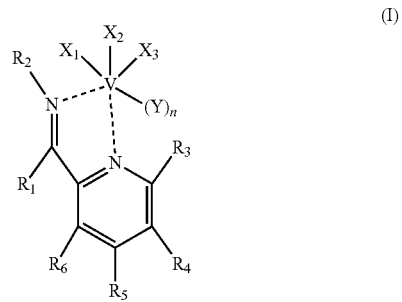

(I)

wherein:
R$_1$, R$_2$, R$_3$, R$_4$, R$_5$ and R$_6$ each independently represent a hydrogen atom, an optionally halogenated linear or branched C$_1$-C$_{20}$ alkyl group, an optionally substituted cycloalkyl group, or an optionally substituted aryl group;
X$_1$, X$_2$ and X$_3$ each independently represent a halogen atom, a linear or branched C$_1$-C$_{20}$ alkyl group, a —OCOR$_7$ group or a —OR$_7$ group, wherein R$_7$ is a linear or branched C$_1$-C$_{20}$ alkyl group;
Y is an ether; and
n is 0 or 1.

6. The process of claim 5, wherein the one or more conjugated dienes comprise 1,3-butadiene or isoprene.

7. The vanadium pyridine-imine complex of claim 1, wherein X$_1$, X$_2$ and X$_3$ each independently represent a linear or branched C$_1$-C$_{15}$ alkyl group.

8. The vanadium pyridine-imine complex of claim 1, wherein n is 0.

9. The vanadium pyridine-imine complex of claim 1, wherein n is 1.

10. The catalytic system of claim 3, wherein the co-catalyst comprises at least one selected from the group consisting of (b$_1$), (b$_2$), (b$_3$) and (b$_4$):
(b$_1$) a compound having a formula (II):

$$Al(R_9)(R_{10})(R_{11}) \qquad (II)$$

wherein R$_9$ represents a hydrogen atom, a fluorine atom, or a linear or branched C$_1$-C$_{20}$ alkyl group, cycloalkyl group, aryl group, alkylaryl group, arylalkyl group, or alkoxy group; R$_{10}$ and R$_{11}$ each independently represent a linear or branched C$_1$-C$_{20}$ alkyl group, cycloalkyl group, aryl group, alkylaryl group, or arylalkyl group;
(b$_2$) an aluminoxane having a formula (III):

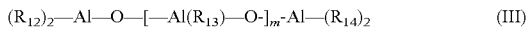
$$(R_{12})_2\text{—Al—O—}[\text{—Al}(R_{13})\text{—O-}]_m\text{-Al—}(R_{14})_2 \qquad (III)$$

wherein R$_{12}$, R$_{13}$ and R$_{14}$ each independently represent a hydrogen atom, a halogen atom, or a linear or branched C$_1$-C$_{20}$ alkyl group, cycloalkyl group, or aryl group, optionally substituted with one or more silicon or germanium atoms; and m is an integer of 0 to 1000
(b$_3$) an aluminum organo-derivative compound that is partially hydrolyzed; and
(b$_4$) a halogen-aluminum alkyl having a formula (IV) or (V):

$$Al(R_{15})_p(X_3)_{3-p} \qquad (IV)$$

$$Al_2(R_{15})_q(X_3)_{3-q} \qquad (V)$$

wherein p is 1 or 2; q is an integer of 1 to 5; each R$_{15}$ independently represents a linear or branched C$_1$-C$_{20}$ alkyl group; and X$_3$ represents a chlorine or bromine atom.

11. The process of claim 5, wherein:
R$_1$ represents a hydrogen atom or a linear or branched C$_1$-C$_{20}$ alkyl group;
R$_2$ represents an optionally substituted cycloalkyl group or an optionally substituted amyl group;
R$_3$, R$_4$, R$_5$ and R$_6$, each represent a hydrogen atom;
X$_1$, X$_2$ and X$_3$, each independently represent a halogen atom;
Y is tetrahydrofuran (THF); and
n is 1;
wherein the co-catalyst comprises an aluminoxane having a formula (III):

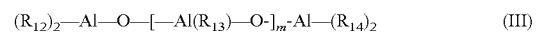
$$(R_{12})_2\text{—Al—O—}[\text{—Al}(R_{13})\text{—O-}]_m\text{-Al—}(R_{14})_2 \qquad (III)$$

wherein R$_{12}$, R$_{13}$ and R$_{14}$ each independently represent a hydrogen atom, a halogen atom, or a linear or branched C$_1$-C$_{20}$ alkyl group, cycloalkyl group, or aryl group, optionally substituted with one or more silicon or germanium atoms; and m is an integer of 0 to 1000.

12. The process of claim 5, wherein R$_1$, R$_2$, R$_3$, R$_4$, R$_5$ and R$_6$ each independently represent an optionally halogenated linear or branched C$_1$-C$_{15}$ alkyl group.

13. The process of claim 5, wherein X$_1$, X$_2$ and X$_3$ each independently represent a linear or branched C$_1$-C$_{15}$ alkyl group.

14. The process of claim 5, wherein n is 0.

15. The process of claim 5, wherein n is 1.

16. The process of claim 5, wherein R$_2$ is selected from the group consisting of 2,6-di-iso-propylphenyl-2-methylphenyl and 2,4,6-trimethylphenyl.

17. The process of claim 5, wherein the co-catalyst comprises at least one selected from the group consisting of (b$_1$), (b$_2$), (b$_3$) and (b$_4$):
(b$_1$) a compound having a formula (II):

$$Al(R_9)(R_{10})(R_{11}) \qquad (II)$$

wherein R$_9$ represents a hydrogen atom, a fluorine atom, or a linear or branched C$_1$-C$_{20}$ alkyl group, cycloalkyl group, aryl group, alkylaryl group, arylalkyl group, or alkoxy group; R$_{10}$ and R$_{11}$ each independently represent a linear or branched C$_1$-C$_{20}$ alkyl group, cycloalkyl group, aryl group, alkylaryl group, or arylalkyl group;
(b$_2$) an aluminoxane having a formula (III):

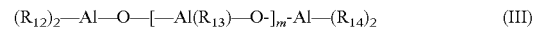
$$(R_{12})_2\text{—Al—O—}[\text{—Al}(R_{13})\text{—O-}]_m\text{-Al—}(R_{14})_2 \qquad (III)$$

wherein R$_{12}$, R$_{13}$ and R$_{14}$ each independently represent a hydrogen atom, a halogen atom, or a linear or branched C$_1$-C$_{20}$ alkyl group, cycloalkyl group, or aryl group, optionally substituted with one or more silicon or germanium atoms; and m is an integer of 0 to 1000
(b$_3$) an aluminum organo-derivative compound that is partially hydrolyzed; and
(b$_4$) a halogen-aluminum alkyl having a formula (IV) or (V):

$$Al(R_{15})_p(X_3)_{3-p} \qquad (IV)$$

$$Al_2(R_{15})_q(X_3)_{3-q} \qquad (V)$$

wherein p is 1 or 2; q is an integer of 1 to 5; each R$_{15}$ independently represents a linear or branched C$_1$-C$_{20}$ alkyl group; and X$_3$ represents a chlorine or bromine atom.

* * * * *